US008172197B2

(12) United States Patent
Gu et al.

(10) Patent No.: US 8,172,197 B2
(45) Date of Patent: May 8, 2012

(54) FAST-ACTING PNEUMATIC DIAPHRAGM VALVE

(75) Inventors: Youfan Gu, Superior, CO (US); Sven Nuesken, Longmont, CO (US)

(73) Assignee: MKS Instruments, Inc., Andover, MA (US)

(*) Notice: Subject to any disclaimer, the term of this patent is extended or adjusted under 35 U.S.C. 154(b) by 1018 days.

(21) Appl. No.: 11/456,044

(22) Filed: Jul. 6, 2006

(65) Prior Publication Data
US 2008/0023661 A1    Jan. 31, 2008

(51) Int. Cl.
*F16K 31/12* (2006.01)

(52) U.S. Cl. ............... 251/30.03; 251/46; 251/129.17; 251/129.21; 251/331; 137/625.27; 137/625.64; 137/627.5

(58) Field of Classification Search ......... 251/30.01, 251/30.02, 30.03, 43, 46, 129.17, 129.21, 251/331, 63.4–63.6; 137/625.27, 625.64, 137/627.5
See application file for complete search history.

(56) References Cited

U.S. PATENT DOCUMENTS

| | | | | |
|---|---|---|---|---|
| 2,964,286 A * | 12/1960 | Hoskins | ............ | 251/30.04 |
| 3,176,954 A | 4/1965 | Cameron et al. | | |
| 3,424,951 A * | 1/1969 | Barker | ............ | 361/170 |
| 3,449,923 A * | 6/1969 | Kivioja et al. | ............ | 62/217 |
| 4,082,116 A * | 4/1978 | Stampfli | ............ | 137/630.14 |
| 4,326,696 A * | 4/1982 | Ishikawa et al. | ........ | 251/129.21 |
| 4,799,645 A * | 1/1989 | Kramer et al. | ............ | 251/30.04 |
| 4,828,219 A * | 5/1989 | Ohmi et al. | ............ | 251/118 |
| 5,131,627 A * | 7/1992 | Kolenc | ............ | 251/331 |
| 5,295,662 A * | 3/1994 | Yamaji et al. | ............ | 251/331 |
| 6,092,550 A * | 7/2000 | Gotch et al. | ............ | 137/365 |
| 6,956,085 B2 * | 10/2005 | Grootaert et al. | ............ | 525/374 |
| 7,802,771 B2 * | 9/2010 | Tsubota et al. | ............ | 251/63.5 |
| 2001/0028049 A1 * | 10/2001 | Mamyo | ............ | 251/63.5 |
| 2002/0092999 A1 | 7/2002 | Longo et al. | | |
| 2004/0011404 A1 * | 1/2004 | Ku et al. | ............ | 137/341 |
| 2005/0092079 A1 | 5/2005 | Ales et al. | | |
| 2007/0187634 A1 * | 8/2007 | Sneh | ............ | 251/30.01 |
| 2010/0090151 A1 * | 4/2010 | Tanikawa et al. | ............ | 251/331 |

FOREIGN PATENT DOCUMENTS

| | | |
|---|---|---|
| DE | 2004004156 | 4/1965 |
| EP | 1353103 | 10/2003 |
| WO | 2005038320 | 4/2005 |

OTHER PUBLICATIONS

Gretchlein, Christian, E., Material Ease, AMPTIAC Quarterly, vol. 8 No. 2, 2004.*
International Search Report for PCT/US2007/072483, International Searching Authority, Jun. 13, 2008, pp. 1-2.

* cited by examiner

Primary Examiner — John Fristoe, Jr.
Assistant Examiner — Marina Tietjen
(74) Attorney, Agent, or Firm — James R. Young; Cochran Freund & Young LLC

(57) ABSTRACT

A fast-acting, pneumatic diaphragm valve includes a diaphragm valve closure member, a pneumatic piston that provides a closure force on the closure member, and a solenoid pilot valve that controls pressurized air to the piston to cause the piston to move in a reciprocal manner so that the closure member opens and closes the valve. The valve seat seal can be elastomer for enhancing speed, and the solenoid pilot valve can be positioned and configured with air flow longitudinally through or past the solenoid armature to enhance speed.

58 Claims, 11 Drawing Sheets

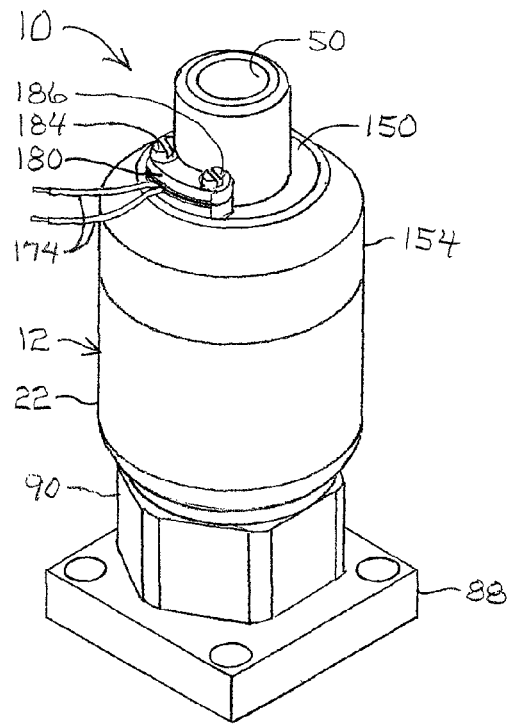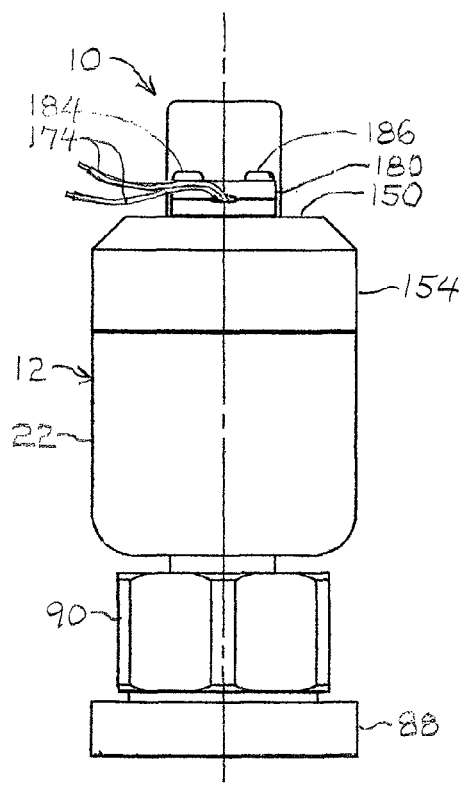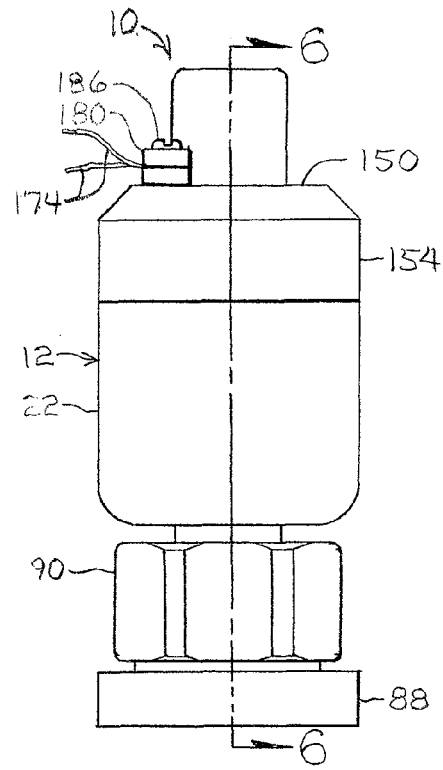

FAST-ACTING PNEUMATIC DIAPHRAGM VALVE

BACKGROUND OF THE INVENTION

1. Field of the Invention

The present invention is related to pneumatic diaphragm valves.

2. State of the Prior Art

There are many uses for valves that open and close in response to some input or inputs, such as electric signals and/or pneumatic actuations. Pneumatic actuations are essentially air switches that are often accomplished by using smaller electric solenoid devices to switch high pressure gas, for example compressed air, on and off to gas actuated larger valves. The gas pressure, for example about 60 to 100 p.s.i.g. (4.1 to 6.9 bar, 0.41 to 0.69 MPa, 0.41 to 0.69 MN/m$^2$), is applied to a valve actuator to open and close one or more valve ports, and the solenoid device or valve turns the high pressure gas to the pneumatic valve actuator on and off. Thus, a small current applied to the solenoid switches a large amount of high pressure gas on and off.

Some uses require valves that are capable of opening and closing very fast as well as to be durable, reliable, and accurate over many open and close cycles and to be resistant to corrosive and highly reactive gases. For example, but not for limitation, in valves used to control flows of precise amounts or measures of reactant gases into semiconductor production reactors, especially for atomic layer deposition (ALD) processes in which precise amounts of reactant gas flows are turned on and off repeatedly and very rapidly through many cycles as thin film layers are grown by one atomic layer or less during every ALD deposition cycle. In such ALD processes, it is desirable for the flow control valves to open and close fast enough to produce virtually digital fully "on" and completely "off" reactant gas flows in high frequency valve cycles or repetitions to maximize the rate of deposition while maintaining precision reactant gas flow control.

Pneumatic diaphragm valves (sometimes also called pilot operated pneumatic valves, pneumatic valves, etc.) are often preferred for many of these kinds of uses, because they are clean, inexpensive, and compact. However, traditional or conventional pneumatic diaphragm valves have had inherent speed limitations and service life deficiencies that limit their usefulness in high speed applications, and the lack of better alternatives has contributed to the difficulty of developing otherwise promising ALD techniques into economical semiconductor fabrication processes on a commercially viable scale. Therefore, improvements have been needed for a number of years to enable pneumatic diaphragm valves to operate effectively at much faster speeds and higher cycle frequencies, which have eluded valve manufacturers prior to this invention.

BRIEF DESCRIPTION OF THE DRAWINGS

The accompanying drawings, which are incorporated in and form a part of the specification, illustrate example implementations of the invention, which is defined by the claims, and they are not intended to imply that the claimed inventions are limited to these or any particular examples or illustrations. In the drawings:

FIG. 1 is an isometric view of an example fast-acting pneumatic diaphragm valve implementation of the claimed invention;

FIG. 2 is a front elevation view of the example fast-acting pneumatic diaphragm valve implementation of FIG. 1;

FIG. 3 is a right side elevation view of the example fast-acting pneumatic diaphragm valve implementation of FIG. 1;

DETAILED DESCRIPTION OF EXAMPLE IMPLEMENTATIONS

An example fast-acting pneumatic diaphragm valve 10 that utilizes example implementations of the improvements of the claimed invention is shown in FIGS. 1-5. These improvements stem from a recognition by the inventors that a number of interrelated problems in traditional pneumatic diaphragm valve designs combine and affect each other to cause the inherent low speed and short life times that have plagued the industry and frustrated hopeful developers of atomic layer deposition (ALD) processes as explained above. For example, traditional pneumatic diaphragm valves for ALD applications use diaphragms in valve bodies to translate mechanical valve closure action in relation to valve seat seals while preventing leakage of contaminants into, or feed gases out of, the valve body. Since most feed gases are very reactive, the traditional diaphragms or other valve closure members and valve bodies are usually stainless steel, and the traditional valve seat seals are usually a chemical resistant plastic. Such plastic valve seat seals have seal surfaces that conform to surfaces on the diaphragms or other valve closure members. The PCTFE (polychlorotrifluoroethylene) seat material in the diaphragm valve in U.S. Pat. No. 6,189,861, issued to Gotch et al. is an example of a state-of-the-art diaphragm valve with a plastic valve seat seal. PCTFE typically has a modulus of elasticity in a range of about 180,000 to 260,000 p.s.i. (1,240 to 1,800 MPa).

Figure 17:
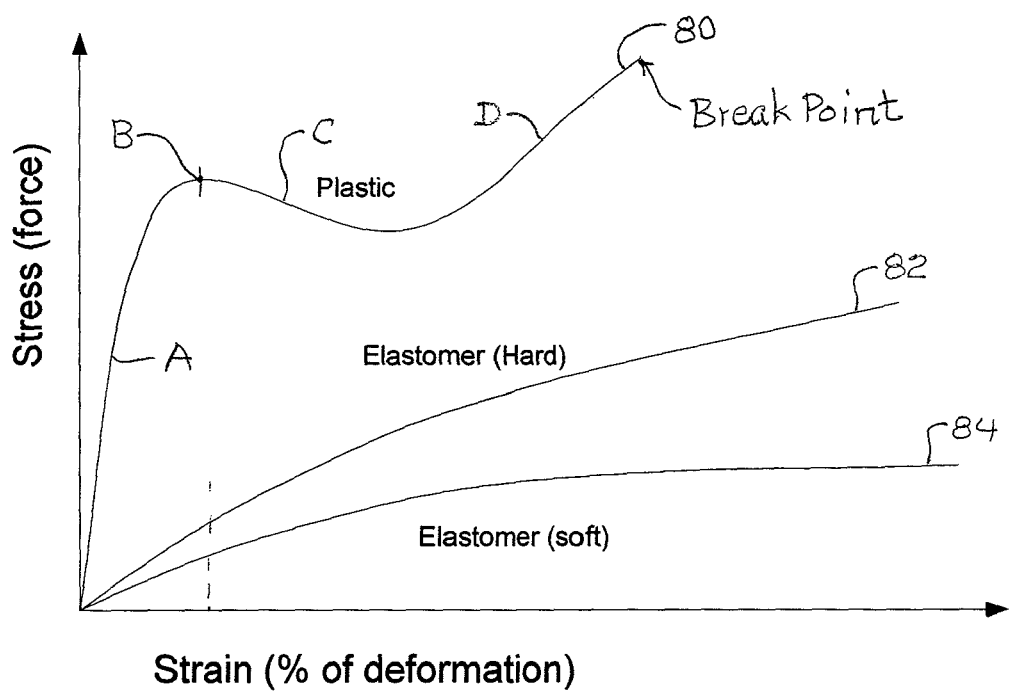
FIG. 17 is a graph showing typical stress versus strain relationships for plastic, hard elastomer, and soft elastomer materials.

Modulus of elasticity, sometimes called Young's Modulus, is the ratio of stress to strain, and it is a common characteristic used by persons skilled in the art of materials science to describe or quantify stiffness of a material. A typical stress versus strain curve 80 that is characteristic of plastic materials is shown in FIG. 17 for comparison with typical stress versus strain curves 82, 84, which are characteristic of hard elastomer materials and soft elastomer materials, respectively. Stress is measured in force per unit of area, e.g., pounds per square inch (p.s.i.), Pascals (Pa), or Newtons per square meter. Strain is the ratio of the change in length to the original length, usually expressed as a percent. With the modulus of elasticity or Young's Modulus being stress divided by strain, the units of the modulus are also p.s.i., Pa, or Newtons/m$^2$. Sometimes the prefix mega or M is used with Pa to mean one million ($1 \times 10^6$) Pascals for more convenient number.

As mentioned above, elastomers are elastic polymers, which have internal molecular structure that give the material "memories" which return them to their original shapes and sizes after being deformed, unless they are deformed enough to break. Plastics may also have some elasticity for a small amount of initial deformation or strain, for example in region A of the curve in FIG. 17, but they soon reach a yield point, as shown at point B in FIG. 17, beyond which further deformation or strain is plastic, so that the material will no longer return to its initial shape and size. The slopes of the curves 80, 82, 84 (stress divided by strain) correspond with the Young's Modulus of the respective materials, which is also known as the modulus of elasticity for the elastically deformable materials, and it is a measure of the stiffness of the materials, i.e., the resistance to deformation. In FIG. 17, it can be seen that the slope of the portion A of the characteristic curve 80, where the typical plastic material has some initial elasticity, is very steep, which illustrates that the modulus of elasticity of such plastic materials is quite high as compared to the much flatter slopes (i.e., modulus of elasticity values) of the curves 82, 84 for the typical hard elastomer materials and soft elastomer materials. Therefore, as illustrated by the curves 80, 82, 84 in FIG. 17, plastic materials have a characteristic initial elasticity with a high Young's Modulus or modulus of elasticity in the initial elastic region A, which decreases as the yield point B is approached, and, upon reaching the yield point B, the slope (Young's Modulus) turns negative and decreases for an initial plastic region C before it turns positive and increases again for the remainder of the plastic region D until the material breaks.

In contrast to the curve 80, which is characteristic of typical plastic materials, the slopes of the characteristic curves 82, 84 for the typical elastomer materials, even the "hard" elastomers, are much lower than the initial elastic portion A of plastic material stress versus strain curve 80, and they do not turn negative. Therefore, the hard and soft elastomer materials typically have much lower modulus of elasticity values than the initial elastic deformation properties of plastic materials. The graph in FIG. 17 does not have units for the stress, because it is intended to show characteristic relationships, not specific stress, strain, or Young's Modulus values for specific materials. However, currently known plastic polymer materials have modulus of elasticity values substantially greater than 50,000 p.s.i. (345 MPa), while typical elastomers have modulus of elasticity values substantially lower than 30,000 p.s.i. (207 MPa), for example, 5,000 p.s.i. (35 MPa) or below.

There are, to be sure, a number of very beneficial attributes of plastic valve seat seals in pneumatic diaphragm valves, not the least of which is the chemical resistance, mechanical strength at temperatures below the glass transition temperature of the material, and ability to conform permanently, i.e., plastically, to mating diaphragm surfaces. However, plastic seals require large contact surface areas mating with corresponding large surface areas of the valve closure members to seal against gas flows or leakages through the valves because of the high mechanical strength and high modulus of elasticity of typical plastic materials. Such high modulus of elasticity values and mechanical strength of typical plastic materials used for valve seat seals in conventional pneumatic diaphragm valves limit the surface deformation and allow for minute leak paths to form between valve closure members and valve seat seals. Consequently, a large surface area is required to decrease the likelihood of a leak path crossing the entire seal. As a result, the required large contact surface areas for such plastic materials require large forces on the closure members to achieve the pressures necessary to create an effective seal, as shown by the fundamental physical relationship $F = P \times A$, where F is force, P is pressure, and A is surface area. This problem compounds to impose the inherent limitations on speed and cycle frequency mentioned above, because the requirement of a large spring force on the closure member to create the pressure necessary for an effective seal, in turn, requires a large area piston in order to overcome the spring force to open the valve. A large area piston requires a large piston chamber, thus more air volume which also requires more pneumatic charging time for pressurizing the cylinder to develop the large piston force necessary to overcome the spring force, because air is a compressible fluid. The large pneumatic charging time limits the speed and cycling frequency that can be attained. Also, the large spring force on the diaphragm causes more stress on the diaphragm, thus shorter diaphragm service life time.

To counter this inherent valve speed and cycle frequency limitation, this invention is directed toward minimizing the volume of air that has to be pressurized to develop the force necessary to seal the closure member on the valve seat, thereby minimizing the pneumatic charging time. A smaller pneumatic charging time allows higher valve opening and closing speed and higher cycle frequency. The volume of air is minimized by use of an elastomer material for the valve seat seal instead of a plastic material and by integrating the solenoid pilot valve into the valve body in a manner that minimizes air volume between the pilot valve and the piston, as will be described in more detail below. Use of an elastomer material for the valve seat seal, instead of a plastic material, decreases the compression force that is necessary to effect an adequate seal to close the valve, because elastomers are softer (less stiff) and have lower modulus of elasticity values than plastics. Consequently, the spring force that has to be applied to the closure member to close the valve and the counteracting piston force that has to be developed to open the valve can both be decreased substantially by using an elastomer instead of a plastic for the valve seat seal. Therefore, for any given pneumatic pressure used, such a smaller piston force required to open the valve allows use of a smaller area piston, thus a smaller volume piston chamber and a smaller volume of air that has to be compressed to the pressure required to develop the required piston force.

As mentioned above, the fast-acting pneumatic diaphragm valve 10 is compact and configured to minimize the volume of air between the solenoid pilot valve 26 and the diaphragm valve actuator piston 36, as will be explained in more detail below, in order to minimize pressure charging time and thereby enable faster as well as higher cycle frequency valve operation. This configuration is achieved at least in part by integrating the solenoid actuator components (e.g., armature 40, coil 52, spool 112, sleeve 114, gland 134, and cap 142 in the FIGS. 1-12 implementation) into a pilot valve 26 within the diaphragm valve body 12 and including, but not limited to, routing pneumatic pilot valve operating air through the solenoid components to function as a pilot valve for the pneumatic valve activator in the diaphragm valve body 12. The integrated solenoid pilot valve 26 is mounted axially over the piston 36 in a manner that also minimizes air volume in ducts and other components where the pilot air is conducted into and out of the piston chamber 64 under the piston 36. Also, the valve seat seal 30 is an elastomer, instead of a plastic, to minimize the closure force required, which allows the use of a smaller area piston 36, thus a smaller volume of air that needs to be compressed to open the valve 15, as will be explained in more detail below. For convenience, the example pneumatic diaphragm valve 10 is described as operating with air, but with the understanding that it can be operated with any gas, not just air.

Figure 6:
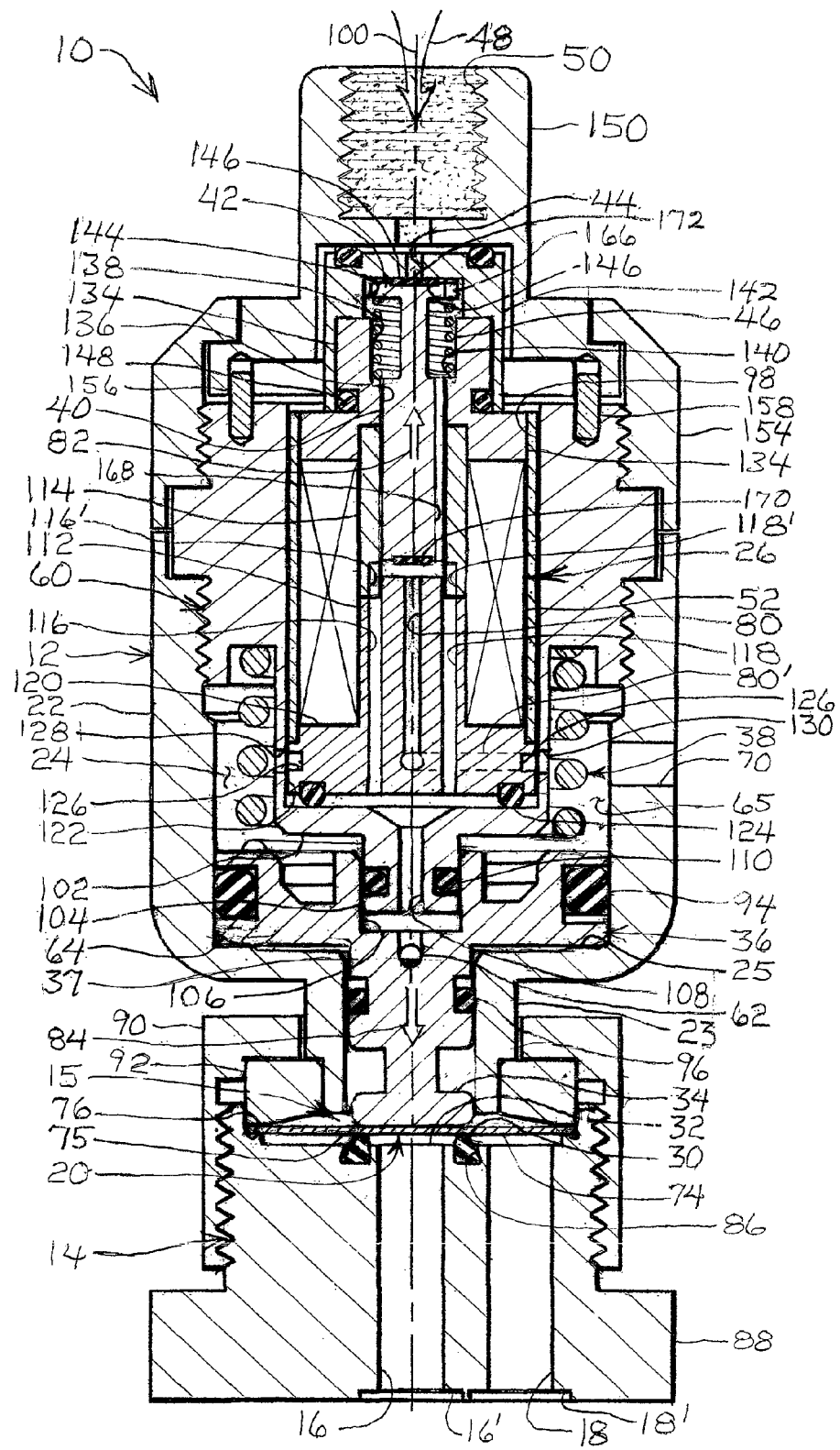
FIG. 6 is an enlarged cross-sectional view of the example fast-acting pneumatic diaphragm valve implementation of FIG. 1 taken along the section line 6-6 of FIGS. 3 and 4 with the pneumatic diaphragm valve in normally closed position.
Figure 8:
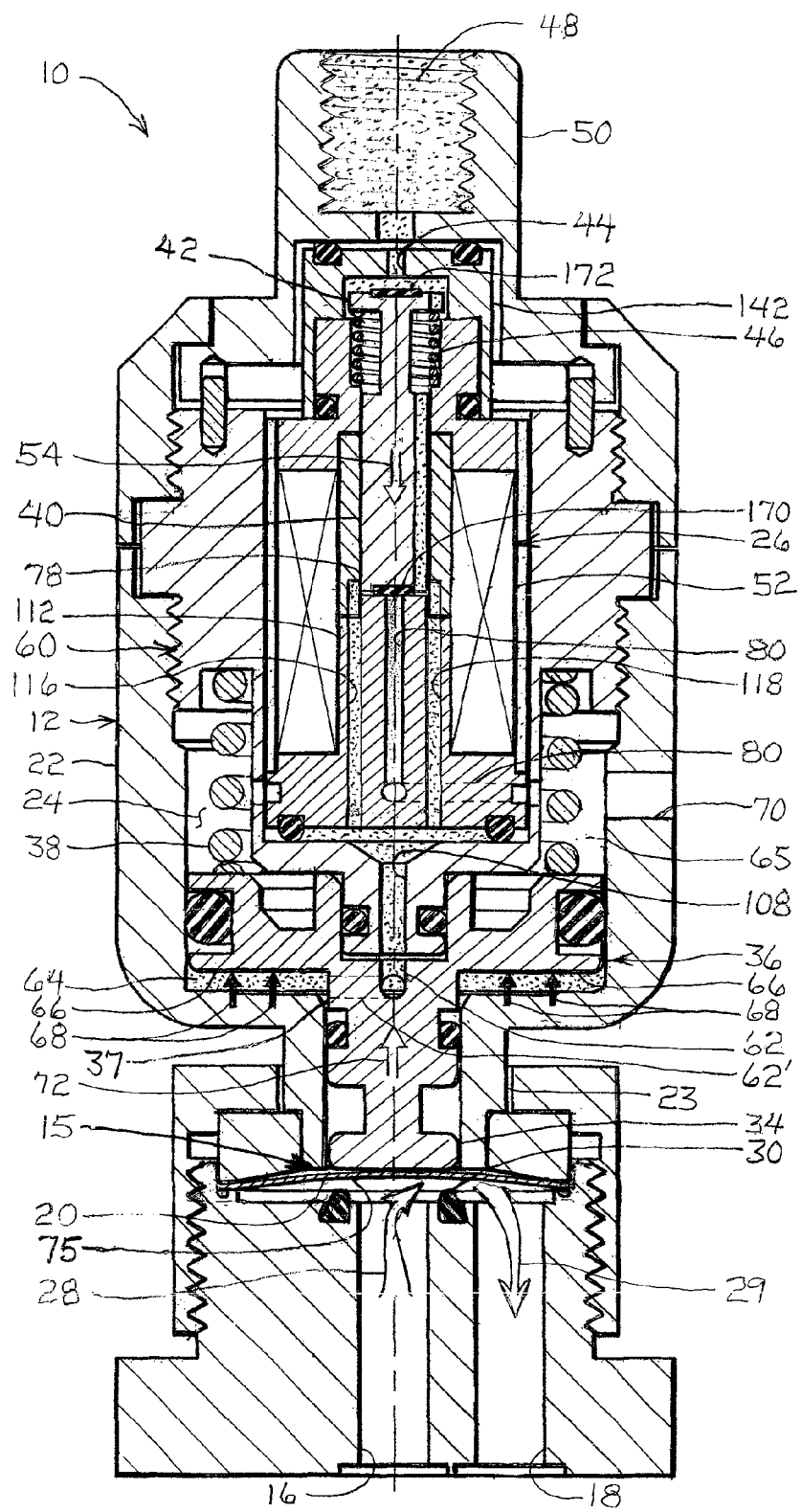
FIG. 8 is an enlarged cross-sectional view similar to that in FIG. 6, but with the pneumatic diaphragm valve actuated to open position.

For an explanation of the example pneumatic diaphragm valve 10, reference is now made primarily to the enlarged cross-sectional view of FIG. 6. As shown in FIG. 6, a diaphragm valve body 12 comprises a base section 14, which includes an inflow duct 16 and an outflow duct 18 for conducting a fluid flow into and out of the diaphragm valve 10 to be turned on and off by a main valve 15. The diaphragm valve body 12 also comprises an actuator housing section 22 for enclosing the pneumatic valve piston chamber 24 and other pneumatic actuator components, which will be described in more detail below. The diaphragm valve 10 in FIG. 6 is illustrated as a normally closed valve, i.e. in the absence of the compressed pilot air supply 48 or of an electric current in the coil 52 of the solenoid pilot valve 26, the valve closure member 20 of the main valve 15 is closed and prevents fluid flow from the inflow duct 16 to the outflow duct 18 as illustrated in FIG. 6. However, the diaphragm valve 10 could also be configured to provide a normally open valve if desired, once the principles of this invention are understood. When the valve closure member 20 is opened, as shown in FIG. 8, the fluid being controlled by the diaphragm valve 10 can flow from the inflow duct 16 to the outflow duct 18, i.e., through the base section 14 and main valve 15 of the diaphragm valve 10, as indicated by the flow arrows 28, 29 in FIG. 8. Of course, the flow direction could be reversed, if desired, i.e., making the duct 18 the inflow duct and making the duct 16 the outflow duct.

Referring again primarily to the normally closed mode of the example diaphragm valve 10 in FIG. 6. The valve seat seal 30 and the valve closure member 20 together comprise the man valve 15. The closure member 20 if the main valve 15 is forced into the held in the closed position against the annular valve seat 30, which encircles the inflow duct port 32 to prevent fluid from the inflow duct 16 to the outflow duct 18. The abutment head portion 34 on the distal end of a protuberance, such as the boss 37, which extends downwardly from the hub of the piston 36, is pushed by a spring, for example the coil compression spring 38, against the closure member 20 to close the main valve 15. The force of the spring 38 should be at least sufficient to push the main valve closure member 20 against the valve seat seal 30 with enough pressure to compress the valve seat seal 30 enough to provide adequate seal, i.e., to prevent leakage of the controlled fluid from the inflow duct 16 to the outflow duct 18 when the main valve 15 is in closed mode. However, to overcome friction and attain high speed valve operation, the force of the spring 38 applied on the piston 36 may be much more than the small closure force necessary to compress (deform) the valve seat seal 30 enough to create an adequate seal. Therefore, the length of the protuberance 37 is made so that the abutment head portion 34 and closure member 20 compress the valve seat seal 30 just the amount needed to create an effective seal in the main valve 15 when the bottom surface of the piston 36 contracts and "bottoms out" on the end wall surface 25 of the housing 22, thereby providing a "limit stop" that limits the movement or travel of the piston 36 and the protuberance 37, thus limiting the extent to which the elastomer valve seat seal 30 is compressed regardless of the amount of spring 38 force that is applied to the piston 36. For example, but not for limitation, if the valve seat seal 30 has to be compressed 0.005 inch in order for it to create an effective seal, then the length of the protuberance 37 is enough to cause the closure member to compress the valve seat seal 30 that required 0.005 inch when the bottom of the piston 36 "bottoms out" on the limit stop of the end wall surface 25. Therefore, even if such compression of the valve seat seal 30 only requires, for example, 5 pounds of force to create an effective seal, the spring 38 loading on the piston 36 can be much more, for example, 20 to 40 pounds in order to provide the speed desired, while the limited compression deformation on the valve seat seal 30 due to the limit stop on the piston 36 limits the extent to which the elastomer valve seat is compressed, thereby limiting the actual compressive closure force on the valve seat seal 30 to the 5 pounds or whatever other force valve that such limited compression deformation develops in the particular elastomer or other material that is used for the valve seat seal 30, as described below, instead of the full 20 to 40 pounds of force that is applied by the spring 38 to the piston 36. Therefore, as explained above, this limit stop feature facilitates the use of a strong spring 38 force on the piston 36 for faster valve actuation speed, while limiting the effective closure force applied by that spring 38 via the piston 36, protuberance 37, and closure member 20 to the elastomer valve seat seal 30 to a lesser force. The actual value of such lesser force depends on the resistance to compression that is developed by the elastomer valve seat seal 30 in the example limited 0.005 inch of compression allowed by the limit stop on the piston 38 movement or travel, which is directly related to the compressive modulus of elasticity of the particular elastomer material used for the valve seat seal 30.

It is worthwhile noting at this point that the solenoid core or armature 40 in the closed valve mode of FIG. 6 has a distal end closure member 42, which is held in a position to close a inlet port 44 by a coil compression spring 46 so that pressurized pilot air (indicated diagrammatically by the speckled fill and arrow 48 in the fitting 50) cannot enter the valve 10. As long as the solenoid armature 40 is held in this closed position, the spring 38 acting on the piston 36 can hold the closure surface 75 of the valve closure member 20 of the main valve 15 against the valve seat seal 30 to keep the main valve 15 closed. Of course, in use, the pressurized pilot air 48 is supplied by a pipe or tube (not shown) from some pressurized source (not shown), which would be connected to the fitting 50, as will be understood by persons skilled in the art. When the armature 40 is pulled magnetically against the force of the pilot solenoid valve spring 46 enough to move the armature 40 axially away from the pilot air inlet port 44, the pressurized pilot air 48 rushes into the valve 10 to cause the pneumatic piston 36 to overcome the force of the spring 38 and open the main valve 15, as will be discussed in more detail below.

Referring now primarily to FIG. 8 for the open valve mode, when an electric current flows through the coil 52 of the solenoid pilot valve 26, a magnetic field is created, which pulls the metal core or armature 40 of the solenoid 26 axially away from the pilot air inlet port 44, as indicated by the arrow 54, so that the pressurized pilot air 48 can rush into the valve 10, as mentioned above. Inside the diaphragm valve 10, the pressurized pilot air flows longitudinally through the solenoid pilot valve 26 and through a duct 108 in the end wall of the pilot valve cradle 60 to the main valve actuator piston 36, as indicated diagrammatically by the speckled fill in FIG. 8. A duct 62 in the piston 36 conducts the pressurized pilot air through the piston 36 to the lower portion 64 of the valve piston chamber 24, which is under the piston 36. In the lower portion 64 of the piston chamber 24, the pressurized pilot air bears on the bottom surface 66 of the piston 36, as indicated by the pressure arrows 68, to push the piston 36 upwardly. The upper portion 65 of the piston chamber 24 is open to the atmosphere through the exhaust port 70 in the housing 22. Therefore, the pilot air pressure that is applied on the bottom surface 66 of the piston 36 creates a net force upwardly on the piston 36 to move the piston 36 upwardly, as indicated by arrow 72, against the force of the compression spring 38. Of course, the pilot air has to have enough pressure applied to enough net surface area 66 of the piston 36 to overcome the downwardly directed force of the compression spring 38 on the piston 36 in order to push the piston 36 upwardly. Persons skilled in the art are very capable of making these kinds of design calculations and choices for any size of valve desired.

Figure 11:
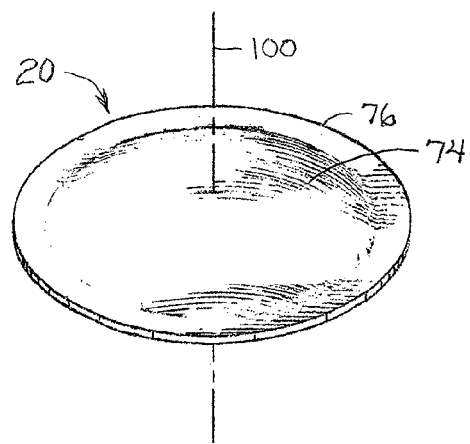
FIG. 11 is an isometric view of an example valve closure diaphragm that can be used to close a valve port in the example pneumatic diaphragm valve of FIG. 1.
Figure 12:
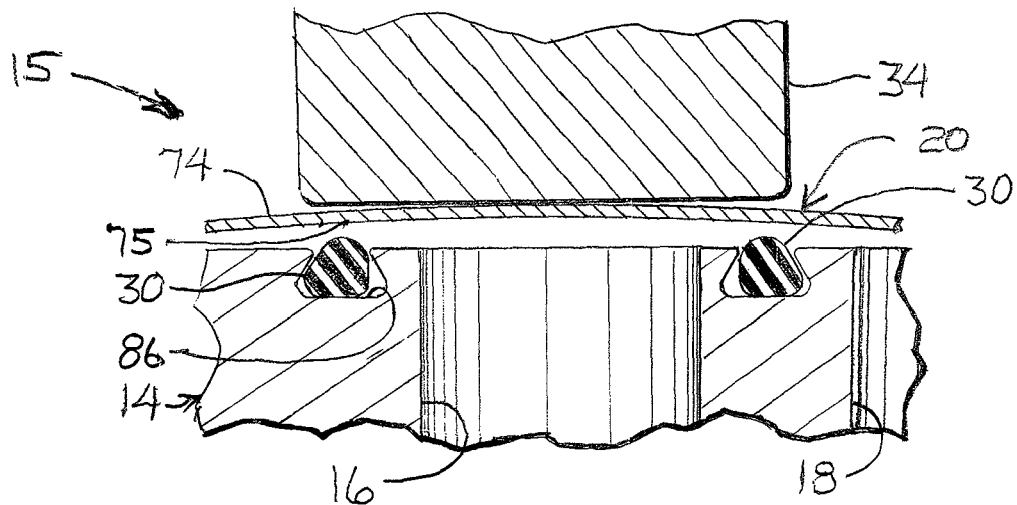
FIG. 12 is an enlarged cross-sectional view of the valve seat seal in FIGS. 6-9.

Of course, when the piston 36 moves upwardly as indicated by the arrow 72 and as described above, it allows the main valve closure member 20 to move away from the valve seat seal 30 to allow the controlled fluid to flow from the inflow duct 16 to the outflow duct 18 as indicated by the flow arrows 28, 29, i.e., to open the main valve 15. In the example pneumatic diaphragm valve 10 shown in FIGS. 1-9, the main valve closure member 20 comprises a resiliently deformable, normally upwardly dished diaphragm 74, as best seen in FIGS. 11 and 12. Therefore, when the head 34 of the piston 36 pushes downwardly on the diaphragm 74 of the closure member 20 as shown in FIG. 6, the diaphragm 74 deforms downwardly to seal its closure surface 75 against the valve seat seal 30. However, when the piston 36 moves upwardly, as shown in FIGS. 8 and 12, the resilient diaphragm 74 springs or "snaps" back to its normal upwardly dished shape and away from the valve seat seal 30 to open the main valve 15. A rim 76 around the periphery of the diaphragm 74 (FIG. 11) can be provided for mounting and retaining the diaphragm 74 in place, as shown in FIGS. 6-9 and will be explained in more detail below.

As long as electric current flows through the solenoid coil 52, the armature 40 leaves the pilot air inlet port 44 open, so the pressurized pilot air can hold the pneumatic diaphragm valve actuator piston 36 up and the main valve closure member 20 remains in the open position, as shown in FIGS. 8 and 12. It is worthwhile to note at this point that while the distal end 42 of the armature 40 is held away from the pilot air inlet port 44, as shown in FIG. 8, the proximal end 78 of the armature 40 is closing a pilot air outlet duct 80 in the solenoid spool 112 so that the pressurized pilot air cannot escape from the interior of the pneumatic valve components. However, as soon as the electric current in the solenoid coil 52 is turned off, the electromagnetic field collapses, and the coil compression spring 46 can again push the armature 40 upwardly, as indicated by the arrow 82 in FIG. 6, to close the pilot air inlet port 44 and at the same time to open the pilot air outlet duct 80. Therefore, with the armature 40 moved to the position shown in FIG. 8, the pilot air in the interior components of the diaphragm valve 10, including pilot air in the lower portion 64 of the piston chamber 24, is depressurized and released through the outlet duct 80 and through the radial duct portion 80', which is shown diagrammatically in phantom lines in FIGS. 6 and 8. From the ducts 80, 80' in the spool 112, the released pilot air flows into the upper portion 65 of the piston chamber 24, which is open to the atmosphere outside the valve 10 via the exhaust port 70 in the housing 22. With the pilot air in the lower portion 64 of the chamber under the piston 36 depressurized, the main valve spring 38 can push the piston 36 downwardly again, as indicated by the arrow 84 in FIG. 6, to move the closure member 20 of the main valve 15 into closed position on the valve seat seal 30.

Of course, turning on the electric current again in the solenoid coil 52 causes the main valve 15 to open again, as explained above, and cycling the electric current on and off will cause the main valve 15 to cycle open and closed. Such cycling can be repeated as often as desired and with whatever frequency is desired within practical limits. As mentioned above, because air is compressible, it does take a certain amount of time in any pilot operated pneumatic valve for the pressurized pilot air to flow into the pneumatic valve components and to charge the spaces with enough pressure to move the pneumatic valve piston against the force of the spring to open or close the valve, which places a practical limit on the frequency at which any particular pneumatic valve is cycled between its open and closed positions. While that problem is not eliminated with the example valve 10 shown in FIGS. 1-9, it is minimized by configuring and arranging the components to minimize the volume of pilot air spaces in the pneumatic solenoid valve 10 between the pilot air inlet 44 and the piston 36 that have to be charged or pressurized to open the main valve 15 so that fast valve action and high frequency valve cycling can be provided. To do so, the solenoid 26 is integrated together with pilot valve components for mounting in the main pneumatic valve piston chamber 24 in axial alignment with the piston 36, as illustrated, for example, in FIGS. 6-9.

Also, fast acting, high frequency cycling has several additional inherent problems. For example, the valve seat seals tend to degrade over time due to the high inertial force from the fast moving actuator piston 36, especially in high temperatures, and the diaphragms crack from material fatigue, regardless of whether they are metal, plastic, or other typical diaphragm materials. Therefore, the valve 10 is configured for easy removal and replacement of those components, as explained below.

Referring now primarily to FIG. 6, the base section 14 of the valve 10 has the inflow and outflow ducts 16, 18, as explained above, and it has an annular groove 86 for retaining the valve seat seal 30. A base flange 88 is provided for mounting the valve 10 on any desired platform or piece of equipment, and recesses 16', 18' are provided for seals (not shown).

The main body 12 of the valve 10 is removably mounted on the base section 14 and fastened there with a retainer nut 90 screwed onto the periphery of the base section 14. The annular collar 92 is welded to the neck 23 of the actuator housing section 22 after the nut 90 is positioned around the neck 23 so that tightening the nut 22 onto the collar 92 also fastens the housing section 22 to the base section 14. The closure member 20 is also retained in place by the nut 90 tightened to squeeze the marginal edge portion 76 of the closure member 20 (diaphragm) between an annular collar 92 and the base section 14. Therefore, both the closure member 20 and the valve seat seal 30 can be accessed easily for removal and replacement by simply unscrewing the nut 90 and separating the base section 14 from the main body 12. The annular valve seat seal 30 shown in FIG. 6 is retained in the base section 14 by a dovetail groove or gland 86 that has a trapezoidal cross-section with rounded edges as best seen in FIG. 12, and it is an elastomer material instead of the plastic materials that are usually used for valve seat seals in traditional pneumatic diaphragm valves, as will be explained in more detail below.

While plastics and other materials can be used for the main valve seat seal 30, there are significant advantages in using an elastomer material for the valve seat seal 30, including, but not limited to, longevity, accuracy, speed, and repeatability of the main valve 15. As mentioned above, this pneumatic diaphragm valve 10 is designed for applications in which these attributes, and especially speed, is important. Plastics have the disadvantage of requiring a substantial amount of force to seal, as explained above, because they require a large interface or mating surface area between the valve seat seal and the closure member to prevent leakage in the closed mode. Applying such a large force to the valve closure member and valve seat seal has at least two disadvantages. First, it requires a stronger spring to apply the stronger force to the valve seat seal, so it requires either a larger piston area or more pilot air pressure, or both, to push the piston upwardly against such larger spring force in order to open the main valve. Either one or both of these requirements, i.e., larger piston area and larger spring force, increase the valve action time, thus making a slower valve for the reasons explained above. Second, such high force causes the diaphragm of the main valve closure member to break after fewer repetitions than would be the case if less force was applied to the diaphragm.

For this fast-acting pneumatic diaphragm valve 10, an ideal valve seat seal 30 would be one that achieves an adequate leak proof seal with minimal force and no deformation, which is not achievable in the real world. To provide an adequate and repeatable seal between the closure member 20 and the valve seat seal 30, e.g., between the closure surface 75 of the diaphragm 74 and the valve seat seal 30 as shown in FIG. 12, as well as between the valve seat seal 30 and the base section 14 or other material into which the seal retaining groove or gland 86 or other seal retaining structure is formed, some elastic deformation of the valve seat seal 30 is required. Therefore, it has been determined that an optimal operating condition for maximizing valve opening and closing speed for the high-speed pneumatic diaphragm valve 10 would be a low compression force and small deformation of the main valve 15 components while still achieving a perfect seal. However, with currently available plastic materials, very high compressive forces are required to achieve an adequate seal. If plastic materials should become available with modulus of elasticity values of 30,000 p.s.i. (207 MPa) or less, preferably, 15,000 p.s.i. (103 MPa) or less, and even more preferably 5,000 p.s.i. (34 MPa), the compression forces needed to provide adequate seals with valve seat seals made of such plastic materials would be low enough to beneficially affect the main valve spring 38 and main actuator piston 36 sizing for enhancing high speed operations of the main valve 15. Since elastomers typically have significantly lower modulus of elasticity values than currently available plastics, they can be used beneficially for the main valve seat seal to enhance valve operating speed capabilities of the pneumatic diaphragm valve 10 by keeping the needed compression force low, e.g., much lower than is needed for currently available plastic valve seat seals, while still providing an adequate seal. Elastomers typically have modulus of elasticity values less than 5,000 p.s.i. (34 MPa). Therefore, for the valve seat seal 30 in this fast-acting pneumatic diaphragm valve 10, an elastomer is desirable for its ability to seal with a small interface area in order to minimize the spring force required to close the main valve 15, as explained above. It is also desirable for it to form the seal with a small amount of compression deformation in order to minimize the distance that the closure member has to travel to attain the seal. Therefore, some elastomers may have better properties than others for this application. For example, if the elastomer material is too soft, i.e., if the modulus of elasticity is too low, a substantial amount of the closure member 20 travel would have to be consumed in just compressing and decompressing the valve seat seal. Therefore, to accommodate such compression, the piston 36 and closure member 20 would have to either (i) be made to travel farther, which would take more time to open and close the main valve 15, thus making the pneumatic diaphragm valve 10 slower, or (ii) leave a smaller gap between the closure member 20 and the seat seal 30 when the main valve 15 is open, which would limit the fluid mass flow rate (flow conductance) through the main valve 15, thereby reducing the flow capacity of the main valve 15. Neither of these options is particularly attractive. However, this problem is mitigated by the use of a relatively "hard" elastomer material for the valve seat seal 30. As illustrated by FIG. 17, a "hard" elastomer has a modulus of elasticity that is somewhat higher than a "soft" elastomer, but it is still much less than the modulus of elasticity of a typical plastic material. Again, the graph in FIG. 17 does not have units, because it is provided as a general visual indication of typical relative material characteristics, but it has been determined that Viton™ elastomer material (a fluoroelastomer with a modulus of elasticity of about 1,000 p.s.i. (6.9 MPa) provides an adequate seal with a small enough deformation under a small enough compression force to not impede conductance, and it has been determined that Chemraz™ elastomer material (a perfluoroelastomer), which is even harder with a modulus of elasticity of about 1,700 p.s.i. (11.7 MPa) is even better with an even smaller deformation still providing adequate seal under a much smaller compression force than typical diaphragm values that use plastic valve seat seals. Based on these results and observations, even harder elastomer materials, for example, modulus of elasticity of up to 5,000 p.s.i. (34 MPa), and probably up to 15,000 p.s.i. (103 MPa) or even up to 30,000 p.s.i. (207 MPa), would be even better for optimizing small deformation with small enough compression force to be able to achieve the valve operating speed and longevity advantages discussed above and below, although elastomers with modulus of elasticity values up to 5,000 p.s.i. (34 MPa) and higher are not currently available. Consequently, the use of "hard" elastomers to mitigate the valve conductance and closure member travel problems discussed above that might otherwise be associated with use of elastomer materials for the valve seat seal 30 includes elastomers with modulus of elasticity values of 1,000 p.s.i. (6.9 MPa) or above that are now available or that might become available. In any event, experiment results have shown that elastomer valve seat seals 30 outperform plastic for the following reasons: (1) substantially less force is required to make an adequate seal; and (2) the slightly higher deformation of elastomer compared to that of plastic does not have a significant negative impact on flow conductance, which can also be mitigated with mechanical design parameters as will be discussed below. Also, elastomer valve seat seals are much easier to remove and replace than plastic valve seat seals, which tend to plastically conform in shape to and around their retaining structures making them very difficult to remove.

The amount of compression deformation of the elastomer valve seat seal 30 required to achieve an adequate seal in the main valve 15 can also be mitigated by using the rounded trapezoidal cross-sectional configuration with the trapezoidal or "dovetail" cross-sectional configuration for the retaining groove or gland 86 as shown in FIGS. 6 and 12. A conventional elastomer O-ring with a circular cross-section could also be used for the valve seat seal 30, but, with currently available elastomer materials, such conventional O-ring configurations have to compress in the range of 10 to 20 percent of their diameters to seal effectively in the typical differential fluid pressures that would be encountered in typical semiconductor fabrication feed gas applications, for example, 1 to 3,000 torr. That amount of deformation could lead to some of the conductance problems discussed above, which could be mitigated by even harder elastomers as they become available as also discussed above, or by mechanical design adjustments, for example, by using larger diameter O-rings in relation to the diameter of the valve inflow port 16, as will be discussed below.

On the other hand, the elastomer seat seal 30 with its rounded trapezoidal configuration in the "dovetail" gland 86 shown in FIGS. 6 and 12 and made of Chemraz™ perfluoroelastomer with, for example, a vertical dimension in a range of 0.040 to 0.060 inch provides an effective sealing footprint that needs only 0.002 to 0.008 inch (0.05 to 0.15 mm) of compression, which is about 2 to 10 percent of its thickness in the vertical direction, to form an effective seal with the typical differential fluid pressure range mentioned above, and such compression can be provided by about 1 to 5 pounds of force on the elastomer valve seat seal 30. Consequently, with the use of the elastomer seal with the rounded trapezoidal cross-section for the valve seat seal 30 in combination with the smaller air volume of the pneumatic components of the pneumatic diaphragm valve 10 as described above, the opening time for this pneumatic diaphragm valve 10 is only about 3 to 4 milliseconds, as compared to 15 to 20 milliseconds for most other pneumatic diaphragm valves available commercially. The rounded trapezoidal cross-section also enhances seal life in the main valve 15 structure, reduces particulation, improves installation, eliminates failures due to twisting of the seal 30 in the groove 86. Such elastomer seals made with a perfluoroelastomer polymer material are commercially available, for example, from Greene, Tweed & Co., of Kulpsville, Pa., under the trademark Chemraz™, including the rounded trapezoidal cross-section.

As mentioned above, limitations on flow conductance can also be mitigated to some extent by mechanical design parameters, for example, the diameter of the valve seat seal 30 in relation to the size of the inflow duct 16 around which the valve seat seal 30 is positioned or the size of the outflow duct 18, whichever is smaller if they are not equal in size. For the inflow duct 16, for example, the flow path has a cross-sectional area equal to the cross-sectional area of the inflow duct 16, which for a circular cross-section duct 16 is $\pi r^2$ where r is the radius of the inflow duct 16. As shown in FIGS. 6 and 12, the valve seat seal 30 is annular and encircles the inflow duct 16 with a diameter D. The flow area between the sealing surface 75 of closure member 20 and the valve seat seal 30 should be at least as large as the flow path of the inflow duct 16 (or of the outflow duct 18 if it is smaller than the inflow duct 16). The flow area between the sealing surface 75 and the valve seat seal 30 is $\pi D \delta$, where D is the valve seat seal 30 diameter and $\delta$ is the distance or gap between the sealing surface 75 and the valve seat seal 30. Therefore, if $\pi D \delta$ is greater than or equal to $\pi r^2$ when the main valve 15 is fully open, the flow conductance of the main valve 15 will not be impeded by the valve closure member 20 and the valve seat seal 30 when the main valve 156 is fully open. Thus, for a given inflow duct 16 size (or outflow duct 18 if smaller), either the diameter D of the valve seat seal 30, or the gap $\delta$, or both can be adjusted to get the desired relationship of $\pi D \delta \geq \pi r^2$. The gap $\delta$ is equal to the closure member 20 travel less the compression deformation of the valve seat seal 30. The smaller the closure member 20 travel, the faster the main valve 15 can open and close, and, if the closure member 20 is a diaphragm 74, as shown in FIGS. 6 and 12, travel distance may be strictly limited by the amount the diaphragm 74 can flex. Of course, it may be easy to provide a larger diameter D valve seat seal 30 in order to increase the value of $\pi D \delta$, but a larger diameter D valve seat seal 30 also would require a larger force, which is counterproductive to other speed and duration considerations as explained above. Therefore, these parameters of valve seat seal diameter D, valve seat seal deformation, and force can be varied and balanced in relation to each other to provide optimal speed and other operating parameters. As explained above, use of elastomer material for the valve seat seal 30 instead of plastic produces a large premium in force reduction for a small cost in compression deformation, and use of a "hard" elastomer and/or the rounded trapezoidal cross-section reduces further both the compression deformation and the diameter D needed to maintain flow conductance. For example, but not for limitation, for r=0.090 inch and D=0.307 inch with a diaphragm stroke (travel) of 0.050 inch, a valve seat seal 30 deformation of less than 0.010 inch as obtained with the "hard" elastomer and valve seat seal 30 configuration described above maintains a gap $\delta$ greater than 0.040 inch, which satisfies the relationship $\pi D \delta \geq \pi r^2$ and provides a high flow conductance main valve 15.

The actuator housing section 22 of the valve body 12 encloses the piston chamber 24, which contains the pneumatic actuator piston 36, as described above. The piston 36 moves up and down in the chamber 24, as also described above, while the annular seals 94, 96 around the periphery of the piston 36 slidably seal against inside surfaces of the piston housing section 22 to confine pressurized air under the piston 36 during the opening portion of the valve open and close cycle. The compression spring 38, which pushes the piston 36 downwardly to close the main valve 15, is in the piston chamber 24 above the piston 36.

A cradle structure 60 is provided in the valve body 12 for mounting the solenoid pilot valve 26 in the piston chamber 24 in axial alignment with the piston 36. As shown in FIGS. 6-9, the cradle structure 60 can be mounted in the valve body 12, for example, by screwing it into the upper end of the actuator housing section 22 in the example pneumatic diaphragm valve 10. The example cradle structure 60 illustrated in FIGS. 6-9 has an elongated cylindrical cavity 98 with a longitudinal axis that preferably, but not necessarily, aligns with the longitudinal axis 100 of the piston 36. The cradle cavity 98 is open at its upper end for receiving the solenoid pilot valve 26 and terminates at its lower end with an end wall 102. The end wall 102 supports and retains the solenoid pilot valve 26 in the cavity 98 of the cradle 60, and it has a downwardly protruding boss 104 that extends axially into a cavity 106 of mating size and shape in the hub of the piston 36 so that the hub of the piston 36 slides up and down on the boss 104. The boss 104 can be cylindrical with a circular or any other curved cross-sectional shape, or it can have a polygonal cross-section. A duct 108 in the boss 104 conducts pressurized pilot air from the solenoid pilot valve 26 to the piston 36 during the open valve portion of the cycle described above, and it conducts depressurized exhaust air away from the piston 36 during the close valve portion of the cycle. An O-ring seal 110 in an annular groove around the periphery of the boss 104 prevents the pressurized pilot air that is delivered through the duct 108 from escaping between the boss 104 and the piston 36 into the upper portion 65 of the pneumatic piston chamber 24 during the open valve portion of the cycle.

As mentioned above, the solenoid pilot valve 26 is positioned in the cavity 98 of the cradle structure 60. It comprises a coil 52 of electrically conductive wire wound around a spool 112 and a sleeve 114. The sleeve 114 is mounted on and extends upwardly from the upper end of the spool 112. Two intermediate ducts 116, 118 extend longitudinally through the spool 112 parallel to, but laterally offset from, the longitudinal axis 100 for conducting pressurized pilot air to the piston 36 during the open valve portion of the cycle and for conducting depressurized exhaust air from the piston 36 during the close valve portion of the cycle, as will be described in more detail below.

A flange 120 at the lower end of the spool 112 extends laterally outward to the wall 122 of the cradle 60 and helps to confine the wire in the coil 52. An O-ring seal 124 in an annular groove in the bottom of the flange 120 encircles the intermediate ducts 116, 118 and prevents pressurized pilot air from escaping between the flange 120 and the end wall 102 of the cradle 60 during the open valve portion of the cycle. A radial portion 80' of the outlet duct 80 in the spool 112 extends radially through the flange 120 to an annular outlet channel 126 in the periphery of the flange 120, which conducts exhaust air to the outlet ports 128, 130 in the wall 122 of the cradle 60 during the close valve portion of the cycle.

A cylindrical container 132 extends upwardly from the periphery of the flange 120, and it surrounds, contains, and protects the coil 52. A gland 134 is inserted into the upper end of the container 132 and over the upper end of the sleeve 114 to stabilize the sleeve 114 and to help confine the wire in the coil 52. The gland 134 has an axial bore extending longitudinally through its middle. The lower portion 138 of the gland 134 has a diameter that substantially matches the inside diameter of the sleeve 40 and an upper portion 136 that widens enough to accommodate the compression spring 46 and to provide a bearing surface 140 for the lower end of the compression spring 46.

The armature 40 extends slidably through the bores 136, 138 of the gland 134 and is moveable axially upwardly and downwardly, as explained above. A cap 142 with the inlet port 44 is sized and shaped at its lower section to fit matingly over the gland 134, and it has an axial bore 144 into its upper section to receive the upper end of the armature 40. A seating surface 146 at the upper end of the gland 134 interfaces with the upper end of the armature 40 to seal closed the inlet port 44 during the close valve portion of the cycle described above. An O-ring seal 148 in a groove around the periphery of the gland 134 prevents pressurized pilot air from escaping between the gland 134 and the cap 142 during the open valve portion of the cycle.

A bonnet 150, which includes the pilot air supply inlet fitting 50, is positioned over the solenoid pilot valve cap 142 and over the upper end of the cradle structure 60 to close the top of the valve 10 and to provide the inlet fitting 50 for the pressurized pilot air supply. An O-ring seal 152 in an annular groove in the top surface of the cap 142 prevents pressurized pilot air from escaping between the cap 142 and the bonnet 150. A nut 154 screwed onto the cradle structure 60 tightens the bonnet 150 onto the cap 142 and also retains the solenoid pilot valve 26 snugly in the cavity 98 of the cradle 60. The dowel pins 156, 158 are provided to orient the bonnet 150 properly on the cradle structure 60 to ensure that the wires 174 (FIG. 9) do not get twisted or damaged from misalignment of the bonnet 150.

As mentioned above, the solenoid armature 40 is positioned slidably in the sleeve 114, gland 134, and cap 142 to move downwardly in response to an electromagnetic field created by an electric current in the coil 52 and then to move upwardly in response to the force of the spring 46 when the electric current is turned off. When the armature 40 is moved downwardly to open the pilot air inlet port 44, the pressurized pilot air is conducted longitudinally from the inlet port 44, through the bore 144 in the cap 142, through the bores 136, 138 in the gland 134, and through the sleeve 114 to the intermediate ducts 116, 118 in the spool 112. Therefore, the armature 40 is configured to allow such pressurized pilot air to flow through and/or along side the armature 40 in the sleeve 114. There are a number of armature and/or sleeve and gland configurations that can allow such longitudinal pilot air flow through the solenoid pilot valve 26, one example of which is shown in FIGS. 6 and 10.

Figure 4:
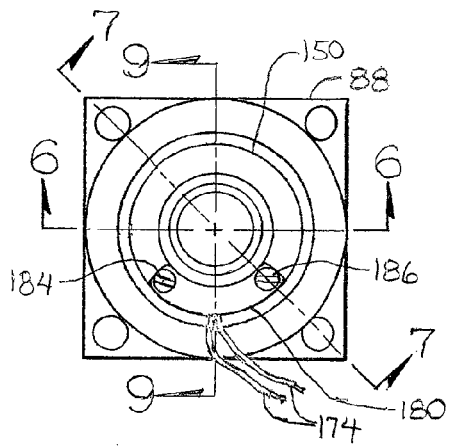
FIG. 4 is a top plan view of the example fast-acting pneumatic diaphragm valve implementation of FIG. 1.
Figure 5:
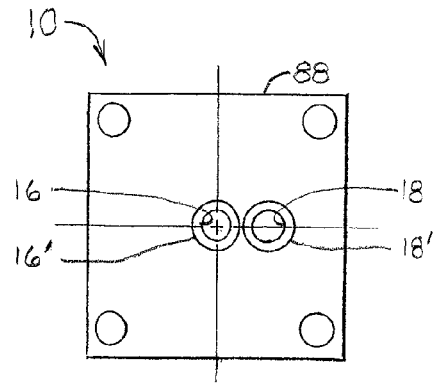
FIG. 5 is a bottom plan view of the example fast-acting pneumatic diaphragm valve implementation of FIG. 1.
Figure 10:
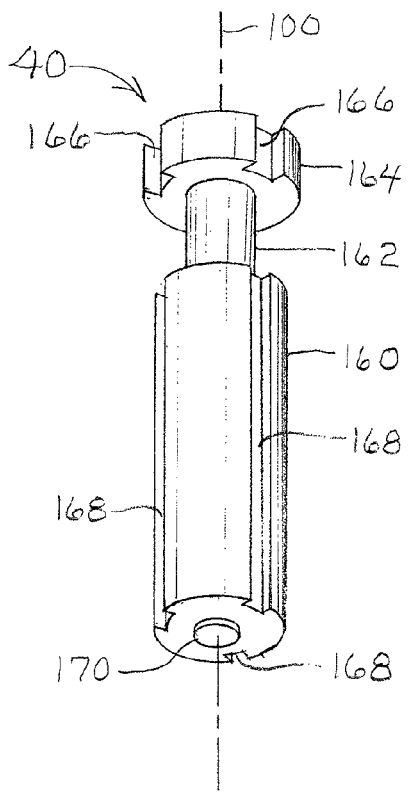
FIG. 10 is an enlarged isometric view of an example solenoid core with longitudinal air channels used in the example fast-acting pneumatic diaphragm valve of FIG. 1.

Referring now primarily to FIG. 10 along with continuing reference to FIG. 6, the example armature 40 shown therein comprises the elongated cylindrical shaft with a main trunk portion 160, a narrower neck portion 162, and a wider head portion 164. The wider head portion 164 provides a bearing surface for the compression spring 46, as shown in FIG. 6 and described above. The narrow neck portion 162 is provided so that the spring 46 does not rub or bind with the armature 40 and to provide a wider air channel.

To accommodate passage of pressurized pilot air through the sleeve 114 to the intermediate ducts 116, 118 in the spool 112, as described above in relation to FIG. 6, at least one, but optionally sever, longitudinal channels 166 are recessed into the head portion 164 and at least one, but optionally several, longitudinal air channels 168 are recessed into the trunk portion 160 of the armature, as best seen in FIG. 10. Therefore, even with the armature 40 positioned in the sleeve 114, gland 134, and cap 142, as described above, the pressurized pilot air from the inlet duct 44 can flow longitudinally through the sleeve 114 of the solenoid pilot valve 26 by flowing through the longitudinal channels 166, 168 in the armature 40.

Of course alternative techniques to accommodate flow of pressurized pilot air longitudinally through the solenoid pilot valve 26 can also be used. For example, one or more longitudinal channels (not shown) could be recessed into the interior walls of the cap 142, gland 134, and sleeve 114 instead of, or in addition to, the channels 166, 168 that are recessed into the armature 40. Also, internal ducts (not shown) instead of, or in addition to, channel(s) 166, 168 could be drilled longitudinally through the armature 40. Also, to accommodate flow of the pressurized pilot air from the channels 166, 168 and/or interior of the sleeve 114 into the intermediate ducts 116, 118 in the spool 112, extensions 116', 118' of the intermediate ducts 116, 118 can be drilled or machined into the lower end of the sleeve 114, as shown in FIG. 6.

As also shown in FIGS. 6 and 10, a seal 170 can be provided on the lower end of the armature 40 to help seal the outlet duct 80 closed during the open valve portion of the cycle so that the pressurized pilot air cannot escape through the outlet port 80 as the piston 36 is being pressured to lift and open the main valve 15. The seal 170 can be flat, as shown in FIGS. 6 and 10, or any other suitable shape, and it can be made of, for example, a resilient rubber, elastomer, plastic, nylon, soft metal, metal foil, or other material that forms and maintains a seal on the opening of the outlet duct 80. Of course, this seal function could also be provided with an annular seal (not shown) in the spool 112 around the opening of the outlet duct 80.

Similarly, another seal 172 can be provided on the upper end of the armature 40 to help seal the inlet duct 44 closed during the close valve portion of the cycle as the air from the piston 36 is being exhausted to close the main valve 15. This seal 172 can be flat as shown in FIG. 6 or any other suitable shape, and it can be made of, for example, a resilient rubber, elastomer, plastic, nylon, soft metal, metal foil, or other material that forms and maintains a seal on the opening of the inlet duct 44 into the cap 142. This function could also be provided by an annular seal (not shown) in the cap 142 around the inlet duct 44 that could be contacted by the upper end of the armature 40.

Figure 7:
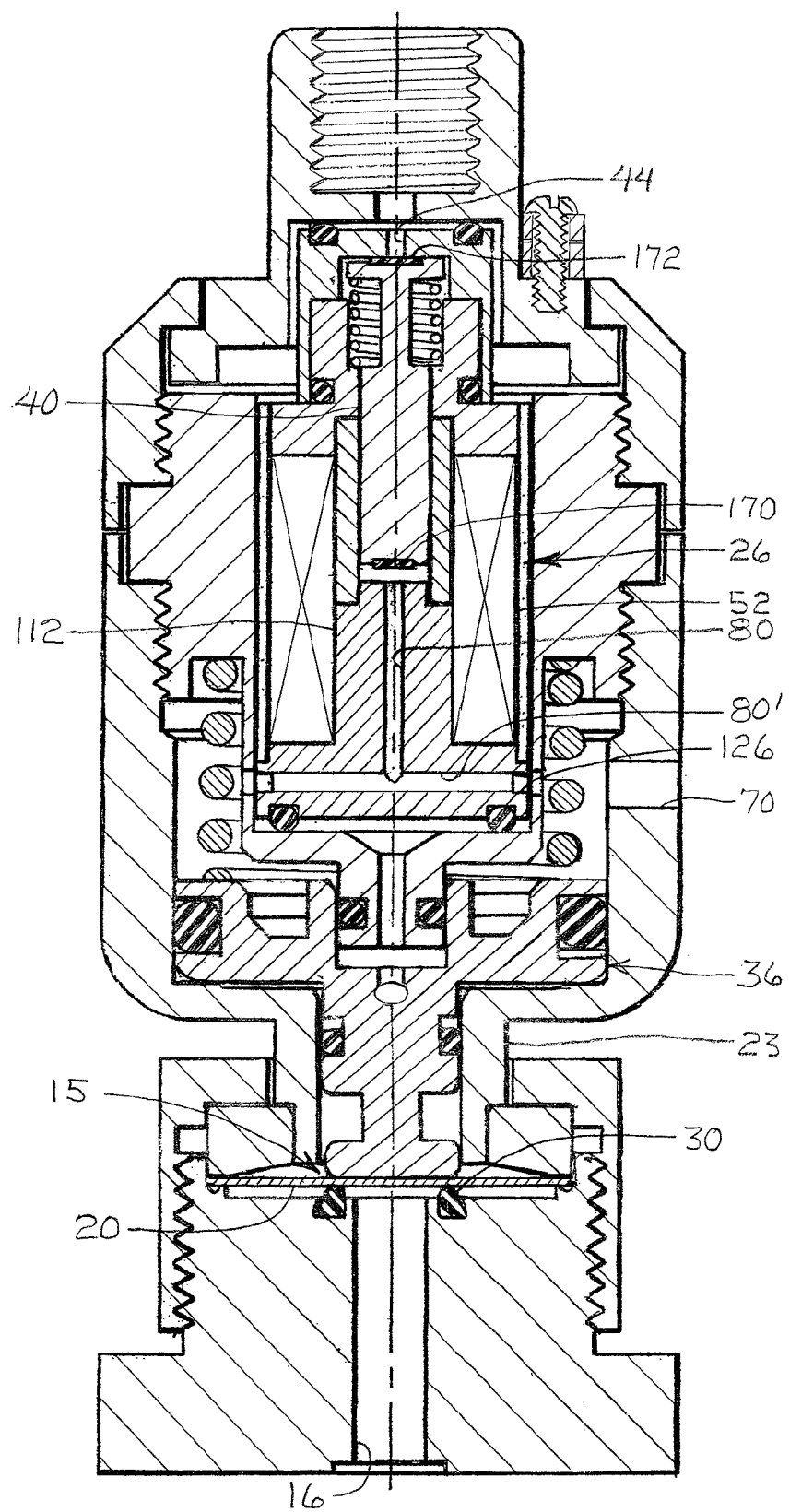
FIG. 7 is an enlarged cross-sectional view of the example fast-acting pneumatic diaphragm valve implementation of FIG. 1 taken along the section line 7-7 of FIG. 4 with the pneumatic diaphragm valve in normally closed position

In summary, in the close valve mode, as shown in FIG. 6, there is no electric current flowing through the coil 52 of the solenoid valve 26, so there is no electromagnetic field, and the spring 46 has the armature 40 pushed upwardly, as indicated by the arrow 82, to close the pilot air inlet duct 44 in the cap 142 and to open the outlet duct 80 in the spool 112. Therefore, pressurized air under the piston 36 is bled through the ducts 62, 108, 116, 118, 80, and 80' into the upper portion 65 of the piston chamber 24, from where it is exhausted through the exhaust port 70 to the atmosphere. FIG. 7, which is a cross-section of the valve 10 in a different orientation (see FIG. 4), shows more clearly the radial portion 80' of the outlet duct 80, which conducts exhaust air to the annular channel 126 in the spool flange 120 for discharge into the upper portion 65 of the piston chamber 24 in the close valve mode. In the FIG. 7 cross-sectional orientation, the longitudinal intermediate ducts 116, 118 are not visible.

To open the main valve 15, the electric current through the solenoid coil 52 is turned on, and the resulting electromagnetic field pulls the armature 40 downward, as indicated by the arrow 54 in FIG. 8. Therefore, as shown in FIG. 8, the seal 172 at the upper distal end of the armature 40 is moved away from the pilot air inlet duct 44, and the seal 170 at the lower proximal end of the armature 40 closes the outlet duct 80 in the spool 112. Therefore, the pressurized pilot air cannot escape from the valve body 12, so it flows through the ducts 116, 118 in the spool 112, through the duct 108 in the boss 104, and through the duct 62, 62' in the piston 36 into the lower portion 64 of the pneumatic piston chamber 24, where it acts on the bottom surface 66 of the piston 36, as indicated by the pressure arrows 68. As a result, the pilot air pressure 68 forces the piston 36 upwardly, as indicated by the arrow 72, so that the diaphragm closure member 20 can move away from the valve seat seal 30, which opens the main valve 15 and allows the controlled fluid to flow from the inflow duct 16 to the outflow duct 18 as indicated by the flow arrows 28, 29.

The lateral section 62' of the duct 62 in boss 37 of the piston 36 is shown diagrammatically by phantom lines, because it is not visible in the orientation of the cross-sectional view in FIG. 8. However, it is visible in the orientation of the cross-sectional view in FIG. 9, where the lateral section 62' is shown extending diametrically through the boss portion 37 of the piston 36 to connect the longitudinal section of the duct 62 to the lower portion 64 of the pneumatic piston chamber 24.

Figure 9:
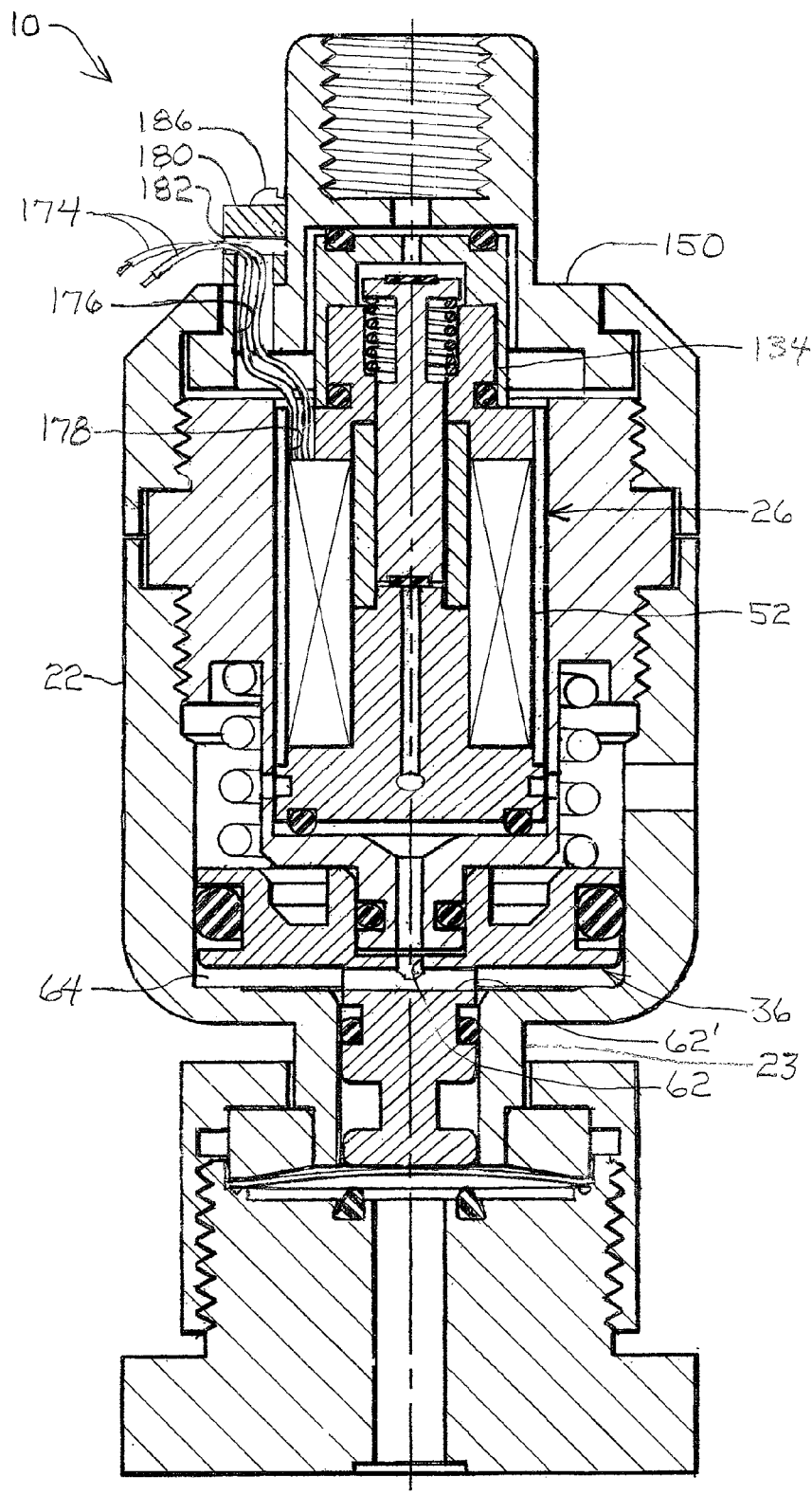
FIG. 9 is an enlarged cross-sectional view of the example fast-acting pneumatic diaphragm valve implementation of FIG. 1 taken along the section line 9-9 of FIG. 4 with the pneumatic diaphragm valve actuated to open position.

The wires 174 that supply electric current to the coil 52 of the solenoid pilot valve 26 are also visible in FIG. 9. They are routed from the coil 52 through a hole 178 in the flange portion of the gland 134, through another hole in the bonnet 150, and through a gasket 182 in a dust cover 180 to the exterior of the valve 10. The dust cover 180 is fastened to the bonnet 150 with two screws 184, 186, as also shown in FIGS. 1-4.

Figure 13:
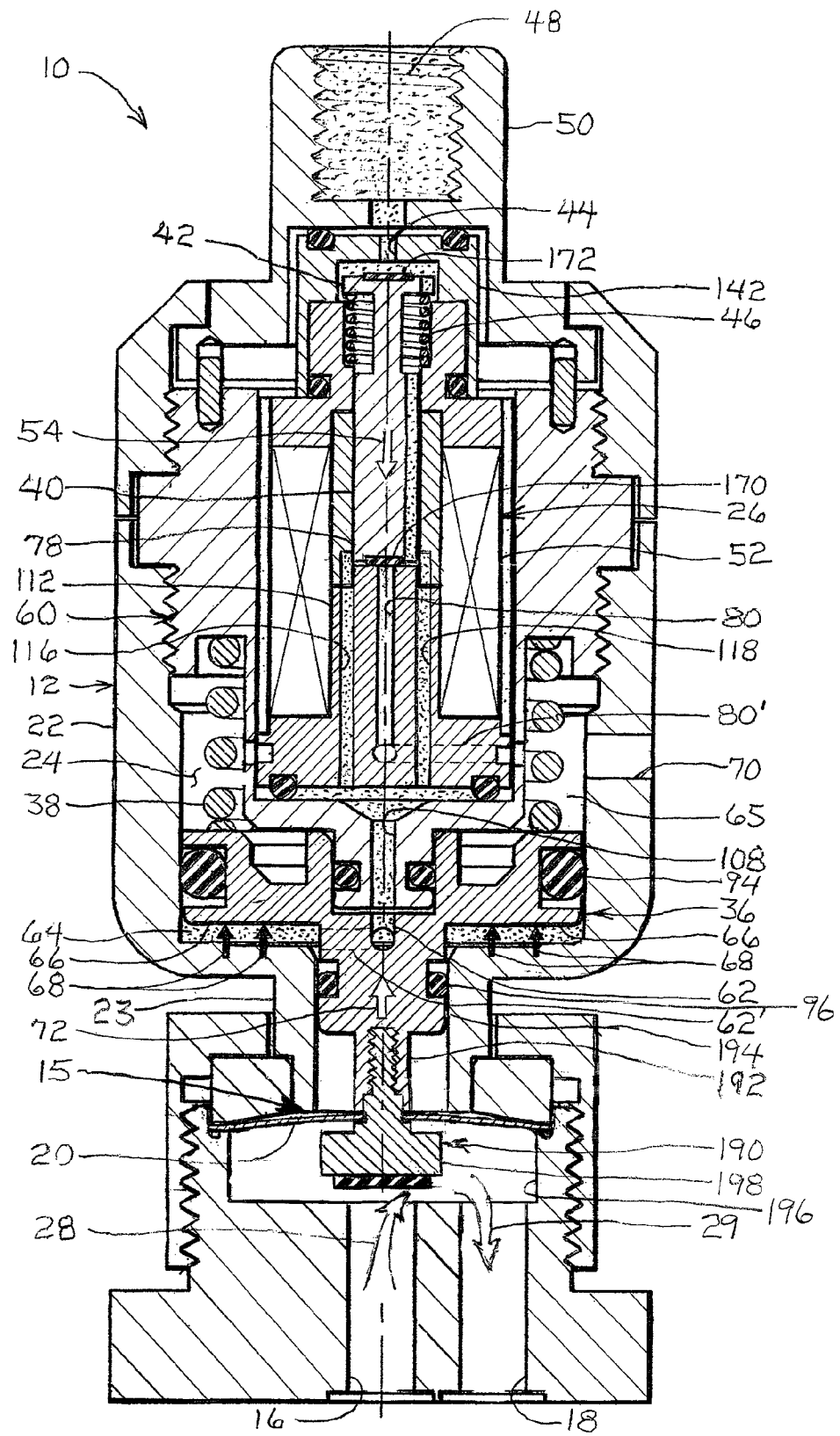
FIG. 13 is a cross-sectional view similar to FIG. 8, but with an alternate main valve closure member.

Another example main valve closure assembly is shown in FIG. 13, which is a cross-sectional view similar to FIG. 8. In this example, the main valve closure assembly comprises a nose piece 190 screwed into a boss 192 extending downwardly from the hub 194 of the piston 36, which extends slidably downward into the neck 23 at the bottom of the actuator housing 22. The nose piece 190 extends through and captures the center of the diaphragm 20 so that the center of the diaphragm 20 moves up and down in unison with the piston 36. A widened head 198 on the distal end of the nose piece 190 has a main valve seal member 200 mounted thereon for closing the inflow duct 16 when the piston 36 moves downwardly to thereby close the main pneumatic valve 15. The seal 200 should be made with a material that is able to conform to the valve seat around the duct 16, including any irregularities, to get a good seal, and it may have to be chemically inert and reaction resistant, depending on the nature of the fluid that is to be flowed through the valve 15. For example, for corrosive or reactive fluids, the seal member 200 can be an elastomer, such as Viton® or Kalrezg, which are available from Dupont Performance Elastomers, of Wilmington, Del., Chemrazg, which is available from Green, Tweed & Co., of Kulpsville, Pa., or any of the materials described above for the seal 30 in FIG. 6. Of course, an annular seal (not shown) similar to the annular seal 30 in FIG. 6 and described above, could be used with the nose piece 190 instead of the flat seal 200 shown in FIG. 12. The diaphragm 20 can be a chemically resistant material, such as stainless steel, to separate and isolate the piston 36 and seals 94, 96 from any chemically reactive fluids flowing through the main valve chamber 196.

Figure 14:
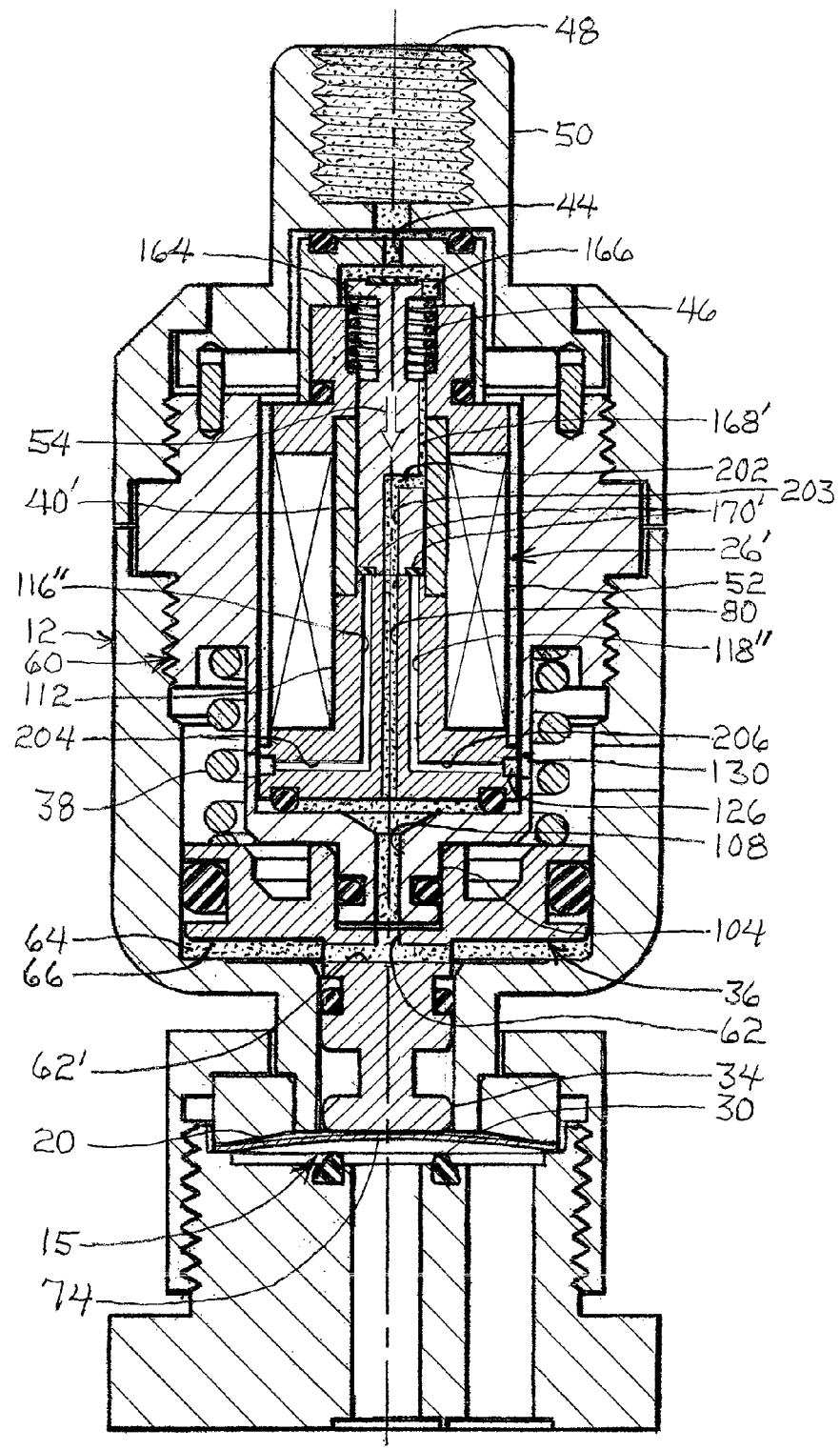
FIG. 14 is a cross-sectional view similar to FIG. 8, but with an alternative solenoid pilot valve configuration.

An alternative solenoid pilot valve 26' configuration is illustrated in FIG. 14, wherein the armature 40' has an axial duct 203 connected to the longitudinal channels 168' by a transverse duct 202 to route pressurized pilot air from the pilot air inlet port 44 to the axial duct 80 in the spool 112. Therefore, in this solenoid pilot valve 26' configuration, the axial duct 80 conducts the pressurized pilot air to the axial duct 108 in the boss 104 of the cradle 60, from where it is directed to the piston 36 to open the main valve 15, as described above, when the armature 40' of the solenoid assembly 26' is moved downwardly as indicated by the arrow 54. In this "down" position of the armature 40', i.e., when the electric current to the solenoid coil 52 is turned on, a seal 170' on the bottom (proximal) end of the armature 40' closes the openings of the longitudinal intermediate ducts 116", 118" in the spool 112, which in this solenoid pilot valve 26' configuration function as the air outlet ducts. Consequently, when the electric current to the coil 52 is turned off so that the spring 46 moves the armature 40' back upwardly to close the pilot air inlet port 44, the bottom end of the armature 40' with the seal 170' moves away from the intermediate ducts 116", 118" to allow the pressurized pilot air from the chamber portion 64 under the piston 36 to escape and be exhausted to the atmosphere, whereupon the spring 38 acting on the piston 36 closes the main valve 15 as described above. Therefore, the longitudinal intermediate ducts 116", 118" are connected by transverse ducts 204, 206 to the annular groove 126, from where the used pilot air is exhausted via the exhaust ports 130 to the atmosphere.

In some applications, the fluid lines or equipment to which the pneumatic diaphragm valves are connected have to be maintained at high temperatures in order to maintain desired characteristics of the fluid that is being controlled by the pneumatic diaphragm valves, for example, to prevent condensation, etc. In such circumstances, it is also often desirable to heat and maintain the valves at those higher temperatures, too, to help maintain the desired fluid characteristics. Such higher temperatures could be detrimental to the solenoid and other actuator components of the pneumatic diaphragm valve, even if the main valve closure member and seat components are temperature tolerant, especially where the valve actuator components are in close proximity to the valve closure member and valve seat as described above.

Figure 15:
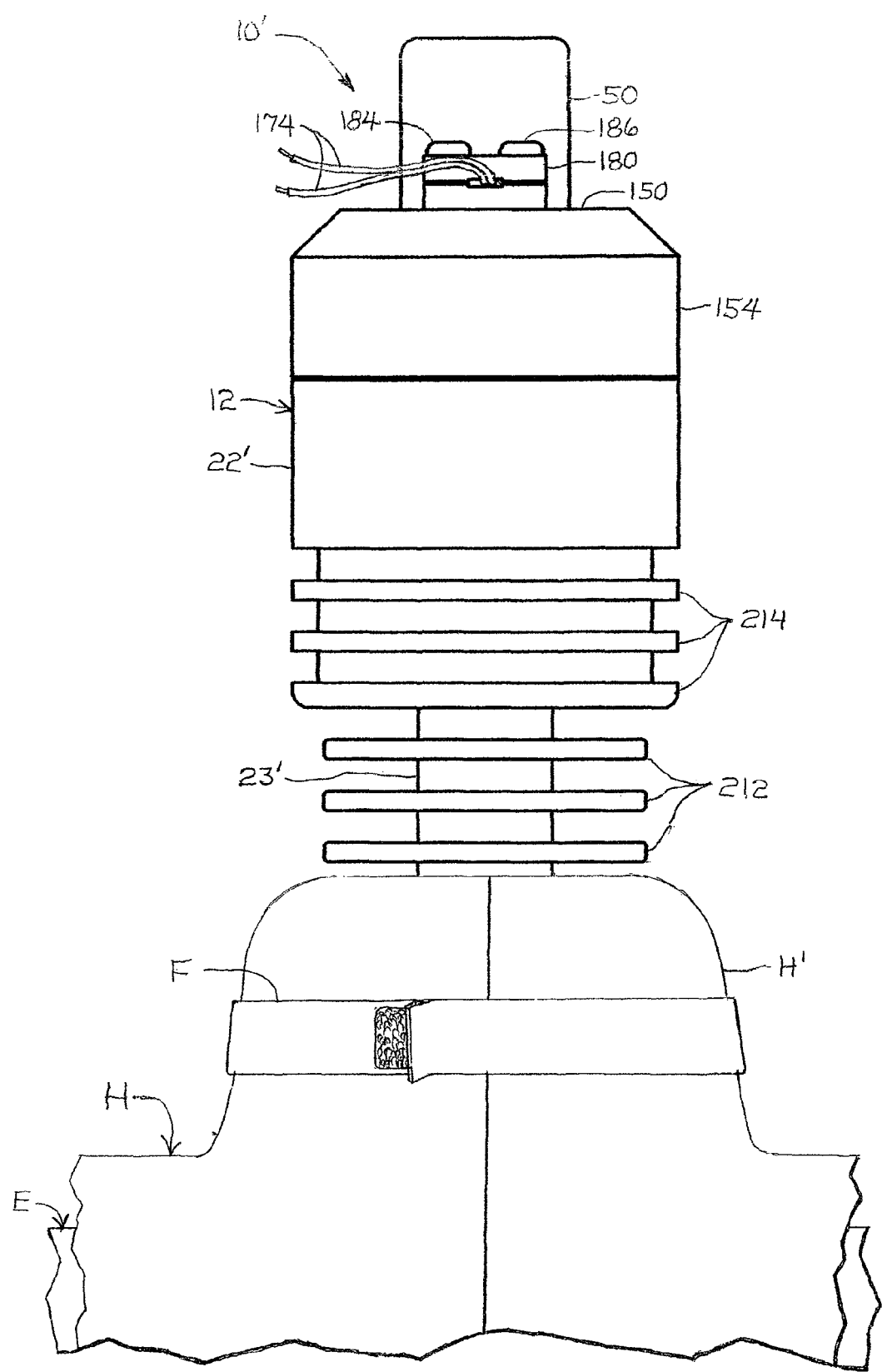
FIG. 15 is an elevation view of the pneumatic diaphragm valve with an optional elongated neck with cooling fins for use in high temperature valve applications.
Figure 16:
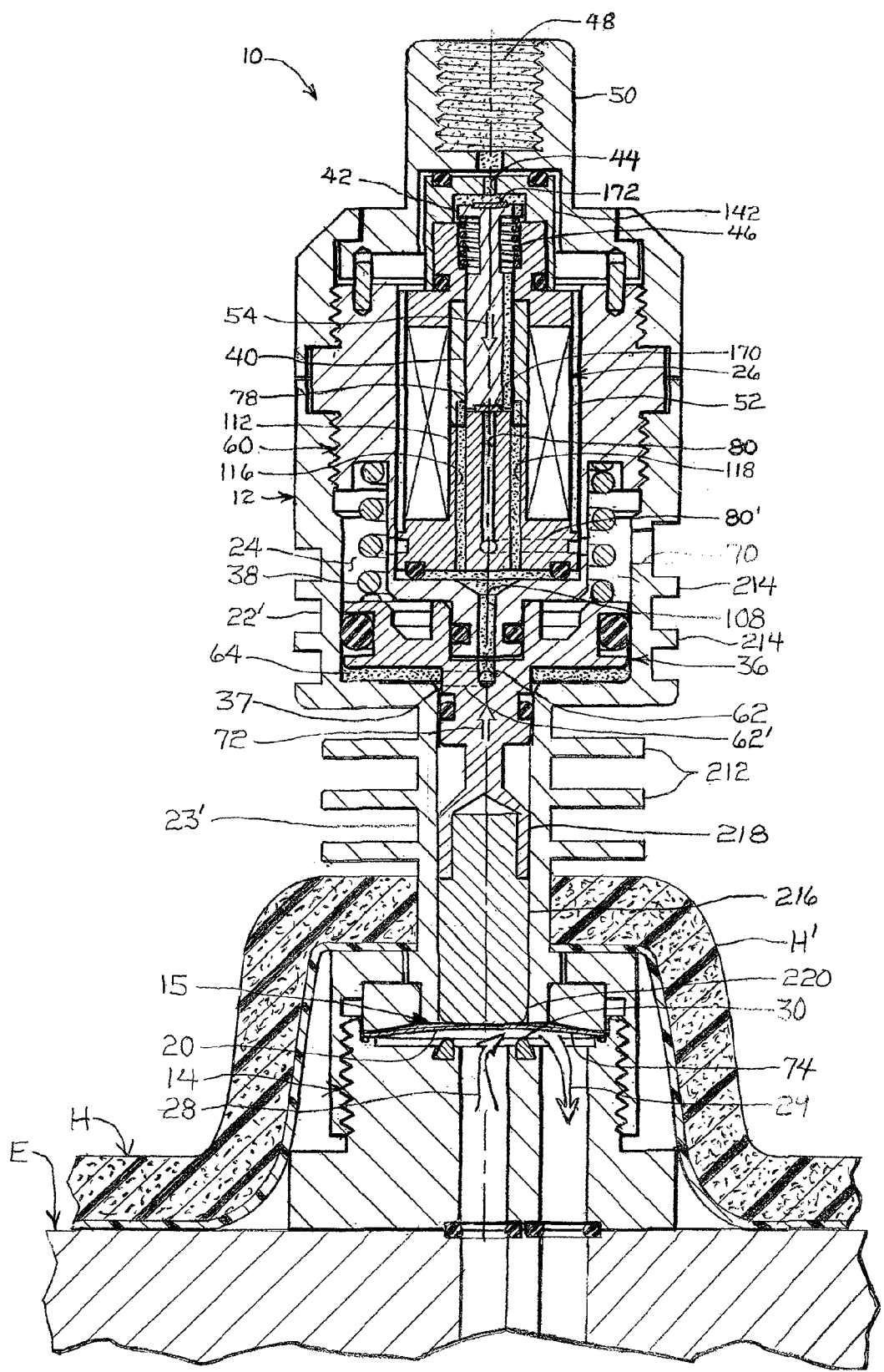
FIG. 16 is a cross-sectional view similar to FIG. 8, but with the alternative elongated neck of FIG. 15 on the pneumatic diaphragm valve body for protecting the valve actuator components in high temperature applications.

Therefore, another embodiment 210 of the pneumatic diaphragm valve is designed for such higher temperature applications, as illustrated in FIGS. 15 and 16. The pneumatic diaphragm valve 210 is shown in FIGS. 15 and 16 with a heater H (not a part of this invention) surrounding the piece of equipment E on which the pneumatic solenoid valve 210 is mounted. A portion H' of the heater H illustrated in FIGS. 15 and 16 is retained by a fastener F around a portion of the valve body 12 in which the main valve 15 is housed, i.e., around the base section 14 and the lower portion of the neck 23', to keep the main valve 15, including the diaphragm closure member 20, at a desired elevated temperature. However, some components of the solenoid pilot valve 26 and other valve actuator components, such as wires, seals, springs, etc., may not be able to withstand such high temperatures and may deteriorate over time. Therefore, to provide some protection from the heat, the actuator housing section 22' of the pneumatic diaphragm valve embodiment 210 in FIGS. 15 and 16 is provided with an elongated neck portion 23' between the piston chamber 24 and the base section 14, so that there is a longer flow path for heat from the base section 14 and lower (distal) end of the neck to flow to the middle and upper portions of the housing section 22', and cooling fins 212 extending radially outward from the elongated neck portion 23' are provided to dissipate a significant amount of heat from the extended neck portion 22' before it can reach the actuator components. Some cooling fins 214 are also provided on the midportion of the actuator housing section 22' to dissipate even more of the heat into the atmosphere.

As shown in FIG. 16, all of the main valve 15 and actuator components, including the solenoid pilot valve 26, can be much the same as described above, e.g., for the pneumatic solenoid valves 10 and 10', except that some accommodation has to be made to transfer the reciprocating mechanical motion of the piston 36 the longer distance through the elongated neck portion 23' to the valve closure member 20. The protuberance or boss 37 on the bottom of the piston 36 could just be made longer to reach to the valve closure member 20. However, some additional heat insulation advantage can be obtained by providing an elongated insert or extension 216 made of a high impact, temperature resistant, and low thermally conductive plastic material, such as polyimide, which can be obtained from Quadrant Engineering Plastic Products, of Reading, Pa. (a division of Quadrant AG of Zurich, Switzerland) under the trademark "Celazole", which is 20 to 50 times less thermally conductive than stainless steel. Consequently, very little heat from the heater H, from the gas flowing through the main valve 15, or from the equipment E gets conducted through the plastic extension 216 to the piston 36. The plastic extension 216 can be attached to the piston 36 in any convenient manner, for example, by an adhesive in a socket 218 extending from the distal end of the protuberance or boss 37 of the piston 36, and it is long enough so that its distal end 220 contacts the main valve actuator 20, which is the diaphragm 74 in the FIG. 16 example. Therefore, while the valve actuator components, including the piston 36, cause the main valve actuator 20 to open and close the main valve 15 in the high temperature embodiment 210 in much the same way as described above for the other embodiments and implementations of the pneumatic diaphragm valve, the longer neck portion 23', the cooling fins 212, 214, and the low thermal conductivity plastic contact member extension or 216 all prevent excessive heat from the heater H, the gas flowing through the main valve 15, and the equipment E from reaching the piston 36 and the other solenoid and actuator parts and components on and above the piston 36.

The foregoing description provides examples that illustrate the principles of the invention, which is defined by the claims that follow. Since numerous insignificant modifications and changes will readily occur to those skilled in the art once they understand the invention, it is not desired to limit the invention to the exact example constructions and processes shown and described above. Also, either the integrated solenoid pilot valve feature, the axial pilot valve and piston arrangement, or the elastomer valve seat seal feature can be used independently of each other, if desired. Accordingly, resort may be made to all suitable combinations, subcombinations, modifications, and equivalents that fall within the scope of the invention as defined by the claims. The words "comprise," "comprises," "comprising," "composed," "composes," "composing," "include," "including," and "includes" when used in this specification, including the claims, are intended to specify the presence of stated features, integers, components, or steps, but they do not preclude the presence or addition of one or more other features, integers, components, steps, or groups thereof. The terms upper, upwardly, lower, bottom, top, down, downwardly, vertical, horizontal, and other directional terms in this description are in reference to the diagrammatic orientations depicted in the drawings and are only used for convenience and clarity in this description unless otherwise indicated. They are not intended to limit the valve 10 or the other embodiments, e.g., 10' and 210, to any particular orientation in real use applications, and, in fact, the fast-acting pneumatic diaphragm valves can be positioned and used in any desired orientation.

The invention claimed is:

1. Valve apparatus, comprising:
   a pneumatic valve comprising a piston that is slidably movable along a longitudinal axis in a piston chamber which has an upper chamber portion above the piston and a lower chamber portion below the piston, wherein the piston has: (i) a peripheral surface that is slidably sealed to an inside wall of the piston chamber, and (ii) a hub that is slidably sealed and movable longitudinally in relation to a boss in the upper chamber portion which has a duct that delivers pressurized pilot air to the piston, and (iii) a duct through the piston that connects the lower chamber portion in fluid flow relation to the duct in the boss;
   a main valve body portion with a main valve opening at a longitudinally spaced distance under the piston so that the piston is movable toward and away from the main valve opening;
   a main valve closure member positioned between the piston and the main valve opening, said main valve closure member being sized and shaped for closing the main valve opening and being movable toward and away from the main valve opening in response to movement of the piston toward and away from the main valve opening, wherein said movement of the main valve closure member toward the main valve opening is sufficient to close the main valve opening and said movement of the main valve closure member away from the main valve opening is sufficient to open the main valve opening;
   a pressurized pilot air inlet port that is connectable to a source of pressurized pilot air; and
   a solenoid pilot valve positioned between the pressurized pilot air inlet port and the boss, said solenoid pilot valve comprising: (i) a sleeve positioned between the pressurized pilot air inlet port and a spool, said spool having an outlet duct that is in fluid flow relation with the atmosphere and opens into the sleeve, and said spool having an intermediate duct that is in fluid flow relation with the duct in the boss and that opens into the sleeve; (ii) a wire coil around the sleeve that creates an electromagnetic field in axial alignment with the sleeve when an electric current flows through the coil; and (iii) an armature positioned slidably in the sleeve and that is responsive to the electromagnetic field for reciprocating movement back and forth between the pressurized pilot air inlet port and the spool, wherein said armature is configured to be a pilot air inlet closure member that closes the pressurized pilot air inlet when the armature is moved in one direction while the intermediate duct and the outlet duct are in fluid flow communication with each other to exhaust air from the piston to the atmosphere, and wherein said armature is configured to be an air outlet closure member that closes the air outlet duct when the armature is moved in the opposite direction while the pressurized pilot air inlet is open to force pressurized pilot air via the sleeve, the intermediate duct, the duct in the boss, and the duct in the piston into the lower chamber portion to move the piston.

2. The valve apparatus of claim 1, including a spring in the solenoid pilot valve that applies a force on the armature directed toward the pressurized pilot air inlet port which must be overcome by the electromagnetic field in order to move the armature in the opposite direction to open the pressurized pilot air inlet port and to close the air outlet duct.

3. The valve apparatus of claim 1, including a spring in the piston chamber that applies a force on the piston directed toward the main valve opening which must be overcome by the pressurized pilot air in the lower chamber portion acting on the piston in order to move the piston away from the main valve opening.

4. The valve apparatus of claim 1, wherein the main valve opening is aligned with the longitudinal axis of the piston.

5. The valve apparatus of claim 1, wherein the boss is aligned with the longitudinal axis of the piston.

6. The valve apparatus of claim 1, wherein the longitudinal axis of the solenoid sleeve and armature is aligned with the longitudinal axis of the piston.

7. The value apparatus of claim 1, wherein the main valve opening, the main valve closure member, the boss, and the solenoid armature are all aligned axially with the longitudinal axis of the piston.

8. The valve apparatus of claim 1, including a longitudinal air channel in the solenoid to accommodate flow of pressurized pilot air from the pilot air inlet port, through the sleeve, to the intermediate duct.

9. The valve apparatus of claim 1, including a longitudinal air channel in the sleeve to accommodate flow of pressurized pilot air from the pilot air inlet port, through the sleeve, to the intermediate duct.

10. The valve apparatus of claim 1, including a cradle structure with an end wall that comprises the boss positioned in the upper chamber portion in axial alignment with the longitudinal axis of the piston, and wherein the solenoid pilot valve is positioned in and supported by the cradle structure.

11. The valve apparatus of claim 1, wherein the hub of the piston is in slidably sealed relation with the boss.

12. The valve apparatus of claim 11, wherein there is a recessed cavity in the hub of the piston and the boss is extended slidably into said cavity.

13. The valve of claim 1, including a protuberance extending axially from the hub of the piston toward the main valve opening and into contact with the main valve closure member so that said protuberance is positioned to move the main closure member to close the main valve opening when the piston moves toward the main valve opening.

14. The valve apparatus of claim 13, wherein the closure member includes a diaphragm.

15. The valve apparatus of claim 14, including an annular seat seal positioned around the main value opening, and wherein the diaphragm is sized and shaped to close on the annular seat seal to close the main valve opening.

16. The valve apparatus of claim 15, wherein the annular seat seal comprises an elastomer material.

17. The valve apparatus of claim 16, wherein the elastomer material has a modulus of elasticity of at least 1,000 p.s.i. (6.9 MPa).

18. The valve apparatus of claim 16, wherein the elastomer material has a modulus of elasticity in a range of 1,000 p.s.i. (6.9 MPa) to 5,000 p.s.i. (34 MPa).

19. The valve apparatus of claim 16, wherein the elastomer material has a modulus of elasticity which does not exceed 15,000 p.s.i. (103 MPa).

20. The valve apparatus of claim 16, wherein the elastomer material has a modulus of elasticity which does not exceed 30,000 p.s.i. (207 MPa).

21. The valve apparatus of claim 15, wherein the annular seat seal comprises a resilient material with a modulus of elasticity that does not exceed 5,000 p.s.i. (34 MPa).

22. The valve apparatus of claim 15, wherein the annular seat seal comprises a resilient material with a modulus of elasticity that does not exceed 15,000 p.s.i. (103 MPa).

23. The valve apparatus of claim 15, wherein the annular seat seal comprises a resilient material with a modulus of elasticity that does not exceed 30,000 p.s.i. (207 MPa).

24. The valve apparatus of claim 15, wherein the annular seat seal comprises a resilient material with a modulus of elasticity in a range of 1,000 to 5,000 p.s.i. (6.9 to 34 MPa).

25. The valve apparatus of claim 15, wherein the annular seat seal comprises a resilient material with a modulus of elasticity in a range of 1,000 to 15,000 p.s.i. (6.9 to 103 MPa).

26. The valve apparatus of claim 15, wherein the annular seat seal comprises a resilient material with a modulus of elasticity in a range of 1,000 to 30,000 p.s.i. (6.9 to 207 MPa).

27. The valve apparatus of claim 15, wherein the annular seat seal comprises a material that has a modulus of elasticity which does not exceed 50,000 p.s.i. (207 MPa).

28. The valve apparatus of claim 15, wherein the annular seat seal comprises a material that has a modulus of elasticity which does not exceed 30,000 p.s.i. (103 MPa).

29. The valve apparatus of claim 15, wherein the annular seat seal comprises a material that has a modulus of elasticity which does not exceed 5,000 p.s.i. (34 MPa).

30. The valve apparatus of claim 15, wherein the annular seat seal has a rounded trapezoidal cross-sectional shape and is positioned in an annular dovetail groove around the main valve opening.

31. The valve apparatus of claim 30, wherein the valve seat seal comprises an elastomeric material.

32. The valve apparatus of claim 30, wherein the valve seat seal comprises a perfluoroelastomeric material.

33. The valve apparatus of claim 13, wherein the closure member includes a nose piece comprising the main valve closure member fastened to a distal end of the protuberance, said main valve closure member including a seal that is shaped and sized to close the main valve opening.

34. The valve apparatus of claim 33, wherein the seal comprises polytetrafluoroethylene (PTFE) material.

35. The valve apparatus of claim 33, wherein the seal comprises an elastomer material.

36. The valve apparatus of claim 33, wherein the seal comprises a resilient material with a modulus of elasticity in a range of 1,000 to 5,000 p.s.i. (6.9 to 34 MPa).

37. The valve apparatus of claim 33, wherein the seal comprises a resilient material with a modulus of elasticity in a range of 1,000 to 15,000 p.s.i. (6.9 to 103 MPa).

38. The valve apparatus of claim 33, wherein the seal comprises a resilient material with a modulus of elasticity in a range of 1,000 to 30,000 p.s.i. (6.9 to 207 MPa).

39. The valve apparatus of claim 1, wherein the piston chamber is enclosed by a cylindrical chamber housing that has a wider inside diameter portion in which the piston is positioned and which narrows to a smaller diameter neck portion under the piston, and wherein the piston has a protuberance that protrudes axially from the hub and in a slidably sealed manner through the smaller diameter portion and into contact with the main valve closure member, said smaller diameter portion being connected to a base section that includes the main valve opening.

40. The valve apparatus of claim 39, including a cylindrical cradle screwed into and enclosing the upper portion of the piston chamber with an end wall of the cradle that includes the boss protruding in slidably sealed relation into a cavity in the hub of the piston, said boss having a boss duct that connects the duct in the piston in fluid flow relation to a space in the cradle, and wherein the solenoid pilot valve is positioned in the cradle with the intermediate duct in the spool being in fluid flow relation to the space in the cradle so that pilot air can flow back and forth between the solenoid pilot valve and the lower chamber via the intermediate duct, the boss, and the duct in the piston.

41. A diaphragm valve, comprising:
a valve inflow duct and a valve outflow duct;
an annular valve seat surrounding an orifice of the valve inflow duct, said annular valve seat comprising an elastomer material that has a vertical direction thickness and a compression modulus of elasticity in a range of 1,000 to 30,000 p.s.i. (6.9 to 207 MPa);
a metal diaphragm positioned adjacent the valve seat with a valve closure surface that is movable to and away from the valve seat for applying a closure force on the valve seat in a manner that elastically compresses the elastomer material a sufficient amount to seal the valve closure surface of the diaphragm on the valve seat to close the valve;
a valve actuator comprising a member positioned to contact and bear on the diaphragm, wherein the member is movable reciprocally toward and away from the valve seat in such a manner that movement of the member toward the valve seat causes the diaphragm to move to the valve seat to close the valve, a closure spring positioned to apply a spring force to the member directed toward the valve seat to close the valve, wherein said spring force is greater than the closure force, and a piston positioned to apply a piston force to the member in opposition to the spring force, said piston being actuateable and de-actuateable repetitively to overcome the spring force to open the valve and then allow the spring force to close the valve repetitively; and
a limit stop positioned to limit the movement of the member toward the valve seat by the spring force to an extent that compresses the elastomer material to a range of 2 to 10 percent of the vertical direction thickness to provide an effective sealing footprint while preventing the closure spring, member, and diaphragm from applying more than the closure force to the valve seat.

42. The diaphragm valve of claim 41, wherein the diaphragm has a resilient elastic memory that tends to resist movement of the closure surface toward the valve seat and that tends to move the closure surface away from the valve seat.

43. The diaphragm valve of claim 41, wherein the member that bears on the diaphragm comprises a protuberance on the piston that is positioned to push the diaphragm to the valve seat, and wherein the closure spring is positioned to bear on the piston to push the piston and the protuberance toward the valve seat so that the protuberance on the piston applies the closure force to the diaphragm to force the closure surface against the valve seat to close the valve.

44. The diaphragm valve of claim 43, including a thermally insulating plastic insert between the piston and the closure surface.

45. The diaphragm valve of claim 44, wherein the plastic insert includes an elongated contact head attached to the protuberance.

46. The diaphragm valve of claim 44, wherein the protuberance and insulating plastic insert extend through an elongated neck from the piston to the closure member.

47. The diaphragm of claim 26, including a plurality of cooling fins extending outwardly from the elongated neck.

48. A method of providing fast-acting valve closure and opening for a pneumatic valve, comprising:
positioning an elastomer valve seat seal having a compression modulus of elasticity in a range of 1,000 to 30,000 p.s.i. (6.9 to 207 MPa) around a valve inflow port;
positioning a valve closure member with a closure surface adjacent the elastomer valve seat seal in such a manner that the closure surface is movable to and away from the elastomer valve seat seal;
positioning a pneumatic piston adjacent the closure member with a protuberance on the piston in a position to apply a closure force to the closure member;
applying a force on the piston that is greater than the closure force in a manner that moves the piston with enhanced speed to apply the closure force to the closure member via the piston to compress the elastomer valve seat seal to a sufficient extent to seal the closure surface onto the elastomer valve seat seal to close the valve while limiting travel of the piston toward the elastomer valve seat seal by the force of the spring to an extent that compressive resistance force developed in the elastomer valve seat by the compression of the elastomer valve seat is less than the force of the spring; and
directing pilot air onto the piston with enough pressure to create a strong enough piston force in opposition to the spring force to allow the closure member to move away from the elastomer valve seat seal to open the valve.

49. The method of claim 48, including limiting the travel of the piston to an extent that results in the closure force applied to the closure member to close the valve being in a range of 1 to 5 pounds.

50. The method of claim 49, wherein the spring force is strong enough such that pilot air pressure applied to the piston to overcome the spring force to open the valve is in a range of 60 to 100 psi.

51. The method of claim 50, wherein the pilot air is applied to a net piston area that creates the piston force in opposition to the spring force, and wherein said net piston area is in a range of 2 to 6 cm$^2$.

52. The method of claim 51, including positioning a solenoid pilot valve, which has am armature that is longitudinally movable on an axis to open and close a pilot air inlet and simultaneously to close and open a pilot air outlet duct, respectively in axial alignment with the piston, and flowing the pilot air from the pilot air inlet through the solenoid pilot valve in longitudinal relation to the armature to the piston to minimize volume of pilot air between a pilot air inlet and the net piston area.

53. The method of claim 52, including aligning the longitudinal axis of the armature with the longitudinal axis of the piston.

54. The method of claim 48, wherein the travel of the closure member is limited to not exceed 1.5 mm.

55. The method of claim 48, wherein the closure force applied to the closure member via the travel-limited piston to close the valve compresses the elastomer valve seat seal in a range of 0.05 to 0.15 mm of the vertical thickness of the elastomer valve seat seal.

56. The method of claim 48, wherein the elastomer valve seat seal has a modulus of elasticity in a range of 1,000 to 5,000 p.s.i. (6.9 to 34 MPa).

57. The method of claim 48, wherein the elastomer valve seat seal has a modulus of elasticity in a range of 1,000 to 15,000 p.s.i. (6.9 to 103 MPa).

58. The method of claim 48, including compressing the elastomer valve seat seal in a range of 2 to 10 percent of its thickness in its vertical direction.

\* \* \* \* \*